(12) United States Patent
Dave et al.

(10) Patent No.: US 9,203,558 B1
(45) Date of Patent: Dec. 1, 2015

(54) SOFT-DECISION DECODING OF DIFFERENTIAL 16-QAM

(71) Applicant: ViaSat, Inc., Carlsbad, CA (US)

(72) Inventors: Sameep Dave, Hinckley, OH (US); Fan Mo, Hinckley, OH (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 14/023,993

(22) Filed: Sep. 11, 2013

Related U.S. Application Data

(60) Provisional application No. 61/755,900, filed on Jan. 23, 2013.

(51) Int. Cl.
  *H04L 23/02* (2006.01)
  *H04L 1/00* (2006.01)

(52) U.S. Cl.
  CPC .................... *H04L 1/0054* (2013.01)

(58) Field of Classification Search
  CPC ................ H04L 1/20; H04L 27/233
  USPC .......................... 375/261, 268, 262
  See application file for complete search history.

(56) References Cited

U.S. PATENT DOCUMENTS

| | | | |
|---|---|---|---|
| 7,457,367 B2 | 11/2008 | Farhang-Boroujeny et al. | |
| 7,813,438 B2 | 10/2010 | Farhang-Boroujeny et al. | |
| 7,848,440 B2 | 12/2010 | Farhang Boroujeny et al. | |
| 8,045,604 B2 | 10/2011 | Farhang-Boroujeny et al. | |
| 2012/0189324 A1* | 7/2012 | Mo et al. | 398/202 |
| 2014/0153625 A1* | 6/2014 | Vojcic et al. | 375/224 |

FOREIGN PATENT DOCUMENTS

| WO | WO-2008063183 A2 | 5/2008 |
|---|---|---|
| WO | WO-2010008949 A2 | 1/2010 |

* cited by examiner

*Primary Examiner* — Qutbuddin Ghulamali
(74) *Attorney, Agent, or Firm* — Holland & Hart LLP

(57) ABSTRACT

Methods, systems, and devices are described for soft-decision decoding of data received from optical signals and encoded using a forward error correction (FED) code. A first reliability information is determined for a subset of the bits corresponding to each symbol transmitted using differentially-encoded 16 Quadrature Amplitude Modulation (16-Qam). A second reliability information is determined for a remaining subset of the bits. The first reliability information is based on log likelihood ration (LLR) calculations used for soft-decision FEC decoding of data transmitted using differentially-encoded Quadrature Phase-Shift Keying (QPSK), while the second reliability information is based on LLR calculations used for soft-decision FEC decoding of data transmitted using coherently-encoded 16-QAM. The second reliability information may be pre-calculated and accessed from a lookup table based on a location of the respective symbol in a complex in-phase and quadrature plane. They symbols are then decoded using the two sets of reliability information.

28 Claims, 19 Drawing Sheets

SOFT-DECISION DECODING OF DIFFERENTIAL 16-QAM

CROSS REFERENCES

This application for patent claims priority benefit of U.S. provisional patent application Ser. No. 61/755,900 to Dave et al., entitled "Soft-Decision Decoding of Differential 16-QAM," filed Jan. 23, 2013, the disclosure of which is incorporated herein in its entirety for all purposes.

BACKGROUND

The present disclosure relates to systems and methods digital modulation and demodulation of data in a fiber optic communications system.

Fiber optic channels in network communications systems are well known and are considered effective for data transmission, allowing relatively high bandwidth data communication. Optical fiber used in such channels is flexible and can be bundled as cables, and is generally considered to be appropriate for long-distance communications because light propagates through the fiber with little attenuation compared to electrical cables. Typical present day commercial optical fiber systems transmit data at 10 or 40 Gigabit-per-second. Each fiber can carry multiple independent channels, each using a different wavelength of light in a technique known as wavelength-division multiplexing or WDM, thereby enhancing the net data rate of an optical fiber.

As more capacity is continually desired for networks, a demand for increased data transmission rates exists. However, in fiber optic systems, as data rates increase various optical phenomena begin to manifest and act to limit data transmission rates. For example, chromatic dispersion and polarization mode may affect the ability of a receiver to demodulate and decode a transmitted optical signal. Forward error corrections (FEC) schemes are often used to send redundant data to address these issues, as well as others.

Many current architectures rely on hard-decision FEC schemes. Although soft-decision FEC schemes are used effectively in other areas of communications, there are implementations and other challenges in high speed optical communications.

SUMMARY

Methods, systems, and devices are described for soft-decision FEC decoding of data from optical signals.

In a first set of embodiments, a method for soft-decision decoding includes determining first reliability information for a subset of the bits corresponding to each symbol transmitted using a differential modulation scheme, where the first reliability information is based on log likelihood ratio (LLR) calculations for differentially-encoded data. Second reliability information of a remaining subset of the bits is determined, where the second reliability information is based on LLR calculations for coherently-encoded data. Each of the symbols is decoded based on the first reliability information and the second reliability information.

In a second set of embodiments, a system for soft-decision decoding includes means for determining first reliability information for a subset of the bits corresponding to each symbol transmitted using a differential modulation scheme, where the first reliability information being based on LLR calculations for differentially-encoded data, means for determining second reliability information of a remaining subset of the bits, where the second reliability information being based on LLR calculations for coherently-encoded data, and means for decoding each symbol based on the first reliability information and the second reliability information.

In a third set of embodiments, a receiver device includes a reliability information module and a decoder module. The reliability information module is configured to determine first reliability information for a subset of the bits corresponding to each symbol transmitted using a differential modulation scheme, where the first reliability information is based on LLR calculations for differentially-encoded data. The reliability information module is also configured to determine second reliability information of a remaining subset of the bits, where the second reliability information being based on LLR calculations for coherently-encoded data. The decoder module is configured to decode each symbol based on the first reliability information and the second reliability information.

In a fourth set of embodiments, a method for soft decision differential decoding includes receiving multiple differentially-encoded input symbols each having in-phase (I) and quadrature (Q) components. A set of terms for each transition between the differentially-encoded input symbols is identified to calculate reliability of the respective transition, where the set for each transition is identified based at least in part on which of the I and Q components from a previous symbol is relevant for the transition and which of the I and Q components of a current symbol is relevant for the transition. A reliability metric is generated for each transition using the respective set.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices are described for soft-decision decoding of data that is received from optical signals and encoded with a forward error correction (FEC) code. In differentially-encoded 16 Quadrature Amplitude Modulation (16-QAM), the bits corresponding to the received symbols are decoded using different reliability information as soft inputs to an FEC decoder. Differentially-encoded 16-QAM may also be referred to as a differentially-encoded 16-QAM scheme or simply as differential 16-QAM. Differential 16-QAM may involve an overlay of a differential Quadrature Phase-Shift Keying (QPSK) modulation on a coherent QPSK modulation. The different sets of reliability information include a first reliability information that is determined for a subset of the bits of the symbols and a second reliability information that is determined for a remaining subset of the bits of the symbols. The first reliability information is based on log likelihood ratio (LLR) calculations used for soft-decision FEC decoding of data transmitted using a differentially-encoded QPSK, while the second reliability information is based on LLR calculations used for soft-decision FEC decoding of data transmitted using a coherently-encoded 16-QAM. Differentially-encoded QPSK may also be referred to as a differentially-encoded QPSK modulation scheme or simply as differential QPSK. The second reliability information may be pre-calculated and accessed from a lookup table based on a location of the respective symbol in a complex in-phase and quadrature plane. The symbols are then decoded using the first reliability information and the second reliability information to correct for errors in the transmission.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
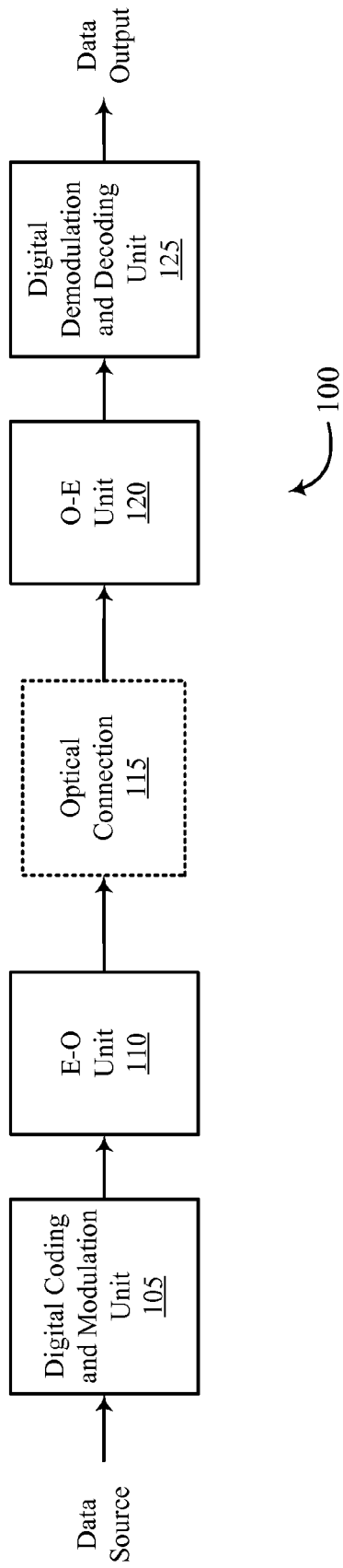
FIG. 1 is a block diagram of an example of an optical communication system including components configured according to various embodiments of the principles described herein.

Systems, devices, methods, and software are described for an optical communication system that uses fiber optic cables as a data transmission medium or path. An example of an optical data transport system 100 is illustrated in FIG. 1. In the present example, the optical data transport system 100 includes a digital coding and modulation unit 105, an electrical-to-optical (E-O) unit 110, an optical connection 115, an optical-to-electrical (O-E) unit 120, and a digital demodulation and decoding unit 125. Each of these components may be in communication, directly or indirectly.

In one embodiment, the optical data transport system 100 includes a data source that provides data to a digital coding and modulation unit 105. The data source may include any of a number of common data sources, such as a user telecommunications device, a cable operator head-end unit, a telecommunications provider central office, a computer server, or a network attached storage system, to name but a few examples. In many embodiments, the data source generates significant quantities of data to be transported across the optical data transport system 100. In some instances, the transmission data rate across the optical data transport system 100 may be 40 Gbps or higher. For example, the transmission data rate may be 100 Gbps or as high as 200 Gbps.

The digital coding and modulation unit 105 receives this data, and performs framing, FEC coding, and modulation functions on the data. The digital coding and modulation unit 105 may differentially encode and modulate the data using 16-QAM (i.e., differential 16-QAM). Differential encoding typically includes techniques in which the data transmitted depends on the current bit or symbol as well as on a previous bit or symbol. In some embodiments, the data may be interleaved to distribute any errors that may occur during transmission over separate blocks. The electrical-to-optical (E-O) unit 110 transforms the data into optical signals, and transmits optical signals containing the data via an optical connection 115. The optical signal produced by the E-O unit 110 may be transmitted to the optical connection 115 by using one or more lasers (not shown), one or more optical components (not shown), and/or one or more electro-optic devices (not shown). The optical connection 115 may include well known components of such connections, including a fiber optic cable. In some embodiments, the optical connection 115 may include any type of medium or path that enables optical signals, or like signals, to propagate. The optical connection 115 may introduce several optical phenomena that may cause phase and/or amplitude distortion.

An optical-to-electrical (O-E) unit 120 receives the optical signal from the optical connection 115, and transforms the data into the electrical domain. The optical signal received by the E-O unit 120 may be received from the optical connection 115 by using one or more lasers (not shown), one or more optical components (not shown), and/or one or more electro-optic devices (not shown). When the optical data is coherently received, phase information included in the optical signal is preserved after the O-E unit 120 transforms the data in the optical signal to the electrical domain.

The digital demodulation and decoding unit 125 receives the digitized version of the optical signal and performs demodulation, FEC decoding, and de-framing functions on the data from the optical signal. When data is interleaved for transmission, the digital demodulation and decoding unit 125 may de-interleave the received data. The digital demodulation and decoding unit 125 may then output the data (e.g., to a user telecommunications device, a cable operator head-end unit, a telecommunications provider central office, a computer server, or a network attached storage system).

During FEC decoding, the digital demodulation and decoding unit 125 performs soft-decision decoding of the data transmitted using differential 16 QAM. The soft-decision FEC decoding uses different reliability information as soft inputs. For example, a first reliability information is determined for a subset of the bits of the recovered symbols while a second reliability information is determined for a remaining subset of the bits of the recovered symbols. The first reliability information is determined by a maximum-likelihood (ML) estimator based on LLR calculations used for soft-decision FEC decoding of data transmitted using differential QPSK. The second reliability information is determined by an ML estimator based on LLR calculations used for soft-decision FEC decoding of data transmitted using a coherently-encoded 16-QAM. The coherently-encoded 16-QAM may also be referred to as a coherently-encoded 16-QAM scheme or simply as coherent 16-QAM. Coherent encoding typical involves mapping a known phase of a received signal to the symbols, where the known phase is obtained by using a reference signal. The second reliability information may be pre-calculated and accessed from a lookup table based on a location of the respective symbol in a complex plane. The symbols are then decoded using the first reliability information and the second reliability information to correct for errors in the transmission.

High-speed digital demodulation and decoding units 125 may typically operate at an analog-to-digital converter (ADC) sample rate of at least twice the symbol rate of the optical signal to achieve acceptable performance levels. However, by including pulse-shaping filters in the digital coding and modulation unit 105 and the digital demodulation and decoding unit 125, at least a portion of the functionality of the digital demodulation and decoding unit 125 may be performed using a sampling rate that is closer to the symbol rate of the optical signal, thereby reducing the complexity and power consumption of the digital demodulation and decoding unit 125. Additionally, by using pulse-shaping filters and DACs during modulation, pre-compensation of non-ideal transmission conditions in the optical connection 115 may be performed by circuitry in the digital coding and modulation unit 105. Similarly, by using ADCs and pulse-shaping filters during demodulation, post-compensation of non-ideal transmission conditions in the optical connection 115 may be performed by circuitry in the digital demodulation and decoding unit 125.

Figure 2:
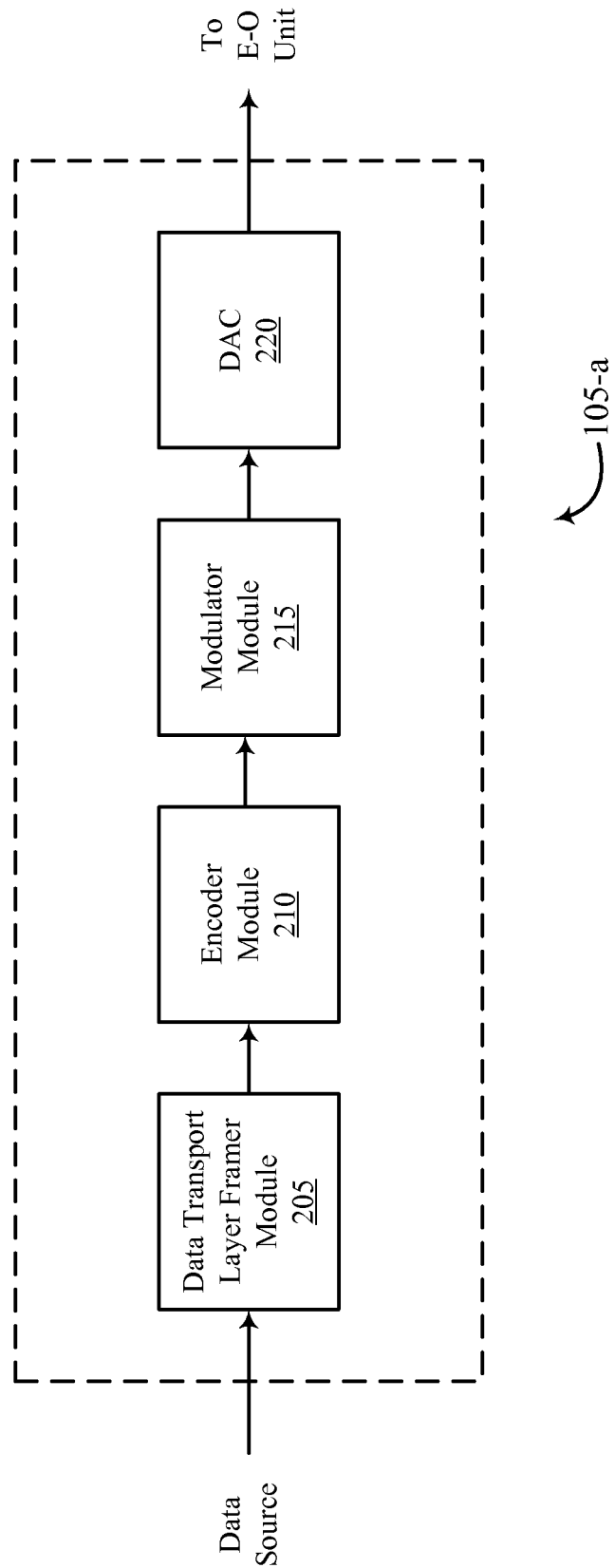
FIG. 2 is a block diagram of an example of a digital coding and modulation module according to various embodiments of the principles described herein.

FIG. 2 illustrates a digital coding and modulation unit 105-a. The digital coding and modulation unit 105-a may be an example of the digital coding and modulation unit 105 described above with reference to FIG. 1. In the illustrated embodiment, the digital coding and modulation unit 105-a includes a data transport layer framer module 205, an encoder module 210, a modulator module 215, and a DAC 220. Each of these components may be in communication, directly or indirectly.

The data transport layer framer module 205 may place the data received from the data source into packet frames for transmission. The packet frames may conform to one of many common protocols for packet frames used in optical communications systems which commonly include a header and a payload, and possibly a trailer, such as a cyclic redundancy check (CRC). As is well understood, the header may be interleaved with the payload during transmission, depending upon the particular protocol being used for optical transmission.

The encoder module 210 may calculate and add forward error correction (FEC) information to the frames of data received from the data transport layer framer module 205. The particular type of FEC information of various embodiments may generally include systematically generated redundant error-correcting code (ECC) data that is transmitted along with the frames.

The modulator module 215 may perform pulse-shaping and pre-compensation filtering on the frames and FEC information, and modulate the frames and FEC information onto one or more sinusoidal waves generated in the digital domain, and forward the data to the DAC 220. The modulator module 215 may use a 16-QAM modulation scheme, for example, to produce differentially-encoded 16-QAM data for transmission. The DAC 220 may convert the digital signal of the modulated data into an analog signal, which may be forwarded to an E-O unit (e.g., E-O unit 110) for conversion from the electrical domain to the optical domain.

Figure 3:
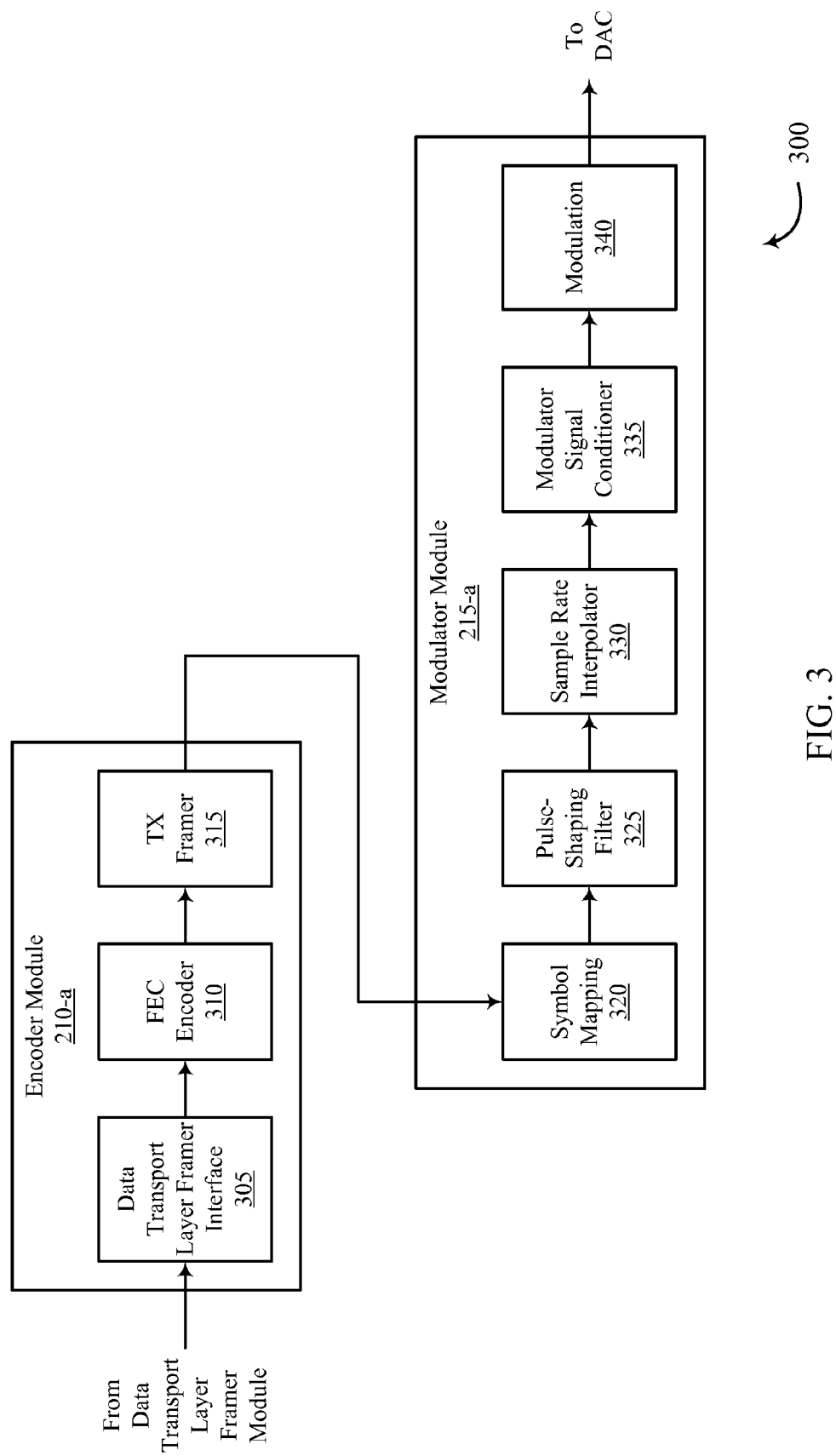
FIG. 3 is a block diagram of an example of an encoder and a modulator in a digital coding and modulation module according to various embodiments of the principles described herein.

FIG. 3 illustrates a system 300 that includes an encoder module 210-a and a modulator module 215-a. Each of these components may be in communication, directly or indirectly. The encoder module 210-a and the modulator module 215-a may be examples, respectively, of the encoder module 210 and the modulator module 215 described above with reference to FIG. 2.

As shown in FIG. 3, the encoder module 210-a includes a data transport layer framer interface module 305, an FEC encoder module 310, and a transmission (TX) framer module 315. The data transport layer framer interface module 305 may receive data to be transmitted from an application or other process external to the encoder 210-a. The data received from the data transport layer may be framed as one or more streams of serial bits for transmission.

The data transport layer framer interface module 305 may forward the data for transmission to the FEC encoder module 310. The FEC encoder module 310 may perform forward error correction on the data to be transmitted. The FEC encoder module 310 may support one of several forward error correction techniques. For example, the FEC encoder module 310 may support Turbo Product Code (TPC) encoding, which may be used to increase data reliability and reduce the overall bandwidth for transmission of the data. Another type of forward error correction is Low-Density Parity Check (LDPC), which is based on a linear error correction code. The transmission framer module 315 may receive the FEC encoded bits and frame the bits for symbol mapping at the modulator 215-a.

The modulator module 215-a may include a symbol mapper module 320, a pulse-shaping filter module 325, a sample rate interpolator module 330, a modulator signal conditioner module 335, and a modulation module 340. Each of these components may be in communication, directly or indirectly.

The symbol mapper module 320 may receive the framed, encoded bits from the transmission framer 315 of the encoder and map the bits to modulation symbols according to a particular modulation scheme. In certain examples, the symbol mapper module 320 may use a 16-QAM modulation scheme to produce differentially-encoded 16-QAM data for transmission.

The symbol-mapped bits may then be received at the pulse-shaping filter module 325 in multiples streams. At the pulse-shaping filter module 325, each of the streams may be filtered in the digital domain with at least one pulse-shaping filter. The at least one pulse-shaping filter may include a finite impulse response (FIR) filter or an infinite impulse response (IIR) filter with adjustable tap coefficients. The at least one pulse-shaping filter may be, for example, a root-raised cosine filter or other known pulse-shaping filter that may reduce or adjust the bandwidth associated with the streams symbol-mapped bits. Additionally or alternatively, each stream of symbol-mapped bits may be filtered using an adjustable time and/or frequency domain filter.

Additionally, the pulse-shaping filter module 325 may filter each stream of symbol-mapped bits to pre-compensate for at least one known or predicted non-ideal transmission condition. The non-ideal transmission condition may occur in the optical space, such as chromatic dispersion and/or timing skew that occurs when an optical signal is transmitted through an optical fiber or other optical medium or path. Additionally or alternatively, the non-ideal transmission condition may occur in the electrical domain. For example, the non-ideal transmission condition may include a non-linear amplifier response at the transmitting or receiving end, or component or channel roll-off that occurs in a DAC, an ADC, or another electrical component.

In certain examples, the non-ideal transmission condition may be predicted or determined based on measurements taken at one or more points in the transmitter, the signal path, or the receiver. For example, a receiver may measure a certain degree of chromatic dispersion in a received optical signal and communicate with the transmitter to provide data about the measured chromatic dispersion. Additionally or alternatively, the non-ideal transmission condition may be modeled or estimated based on known properties of electrical and/or optical components in the signal path between the transmitter and the receiver.

The pulse-shaping filter module 325 may pre-compensate for the at least one identified non-ideal transmission condition by calculating or estimating an effect of the non-ideal transmission condition on the transmitted optical signal and filtering the streams of symbol-mapped bits to at least partially reverse, lessen, or compensate the effect of the non-ideal transmission condition(s). In certain examples, separate filters may be used to create the root-raised cosine pulse shape and to pre-compensate for non-ideal transmission conditions. Alternatively, a single digital filter may be used for each stream to both shape the pulses into the desired root-raised cosine shape and to make further adjustments to the shape of the pulses to pre-compensate for the non-ideal transmission conditions.

The pulse-shaping filter(s) of the pulse-shaping filter module 325 may be dynamically tunable through the use of changeable filter tap coefficients. In certain examples, the type of filter itself may be dynamically changed to pre-compensate for a non-ideal transmission condition. For example, one or more filters in the pulse-shaping filter module 325 may be dynamically changed from a root-raised cosine filter to a simple raised-cosine filter, a Gaussian filter, or a sinc-shaped filter if such a change would more effectively pre-compensate for a known or predicted non-ideal transmission condition.

Additionally, in certain examples it may be possible to dynamically customize the filtering performed at each stream of symbol-mapped bits. For example, when the symbol mapper module 320 produces HI, HQ, VI, and VQ streams, it may be determined that an optical transmission path introduces a timing skew between the HI and HQ streams, but not between the VI and VQ streams. In this example, the properties of a pulse-shaping filter associated with the HI and/or HQ streams may be adjusted to pre-compensate for the timing skew without making adjustments to the VI and VQ streams.

The output of the pulse-shaping filter module 325 may be received at the sample rate interpolator module 330. The sample rate interpolator module 330 may add bits to each of the streams of symbol-mapped bits to increase the sample rate of each stream, for example, to twice the symbol rate. The modulator signal conditioner module 335 may receive the output of the sample rate interpolator module 330 and may perform additional filtering on each of the streams in the digital domain. For example, the modulator signal conditioner module 335 may perform direct current (DC) bias compensation. Additionally or alternatively, the modulator signal conditioner module 335 may filter the streams to compensate for amplitude/amplitude (AM/AM) non-linearity caused by driving amplifiers into saturation and/or amplitude/phase non-linearity. The modulator signal conditioner module 335 may include tunable digital domain filters that may be dynamically adjusted as changes in DC bias or amplifier non-linearity are detected, predicted, or determined. In some embodiments, some or all of the functionality of the modulator signal conditioner module 335 is performed at the phase-shaping filter module 325.

The output of the modulator signal conditioner module 335 may be received by the modulation module 340. The modulation module 340 may generate sinusoidal waves or waveforms in the digital domain and modulate the filtered, up-sampled, and conditioned symbol-mapped bits that are output by the modulator signal conditioner module 335 onto the sinusoidal waveforms. In certain examples, the sinusoidal waveforms may have a relatively low intermediate frequency.

The modulated waves may be output by the modulation module 340 to one or more DACs (not shown), which may convert each modulated carrier wave from the digital domain to the analog domain. The waveforms in the analog domain that are output by the DAC(s) may undergo amplification and additional conditioning. When H and V polarizations are used, the amplified and conditioned waveforms may be converted into separate H and V optical signals at an E-O unit (not shown).

Figure 4:
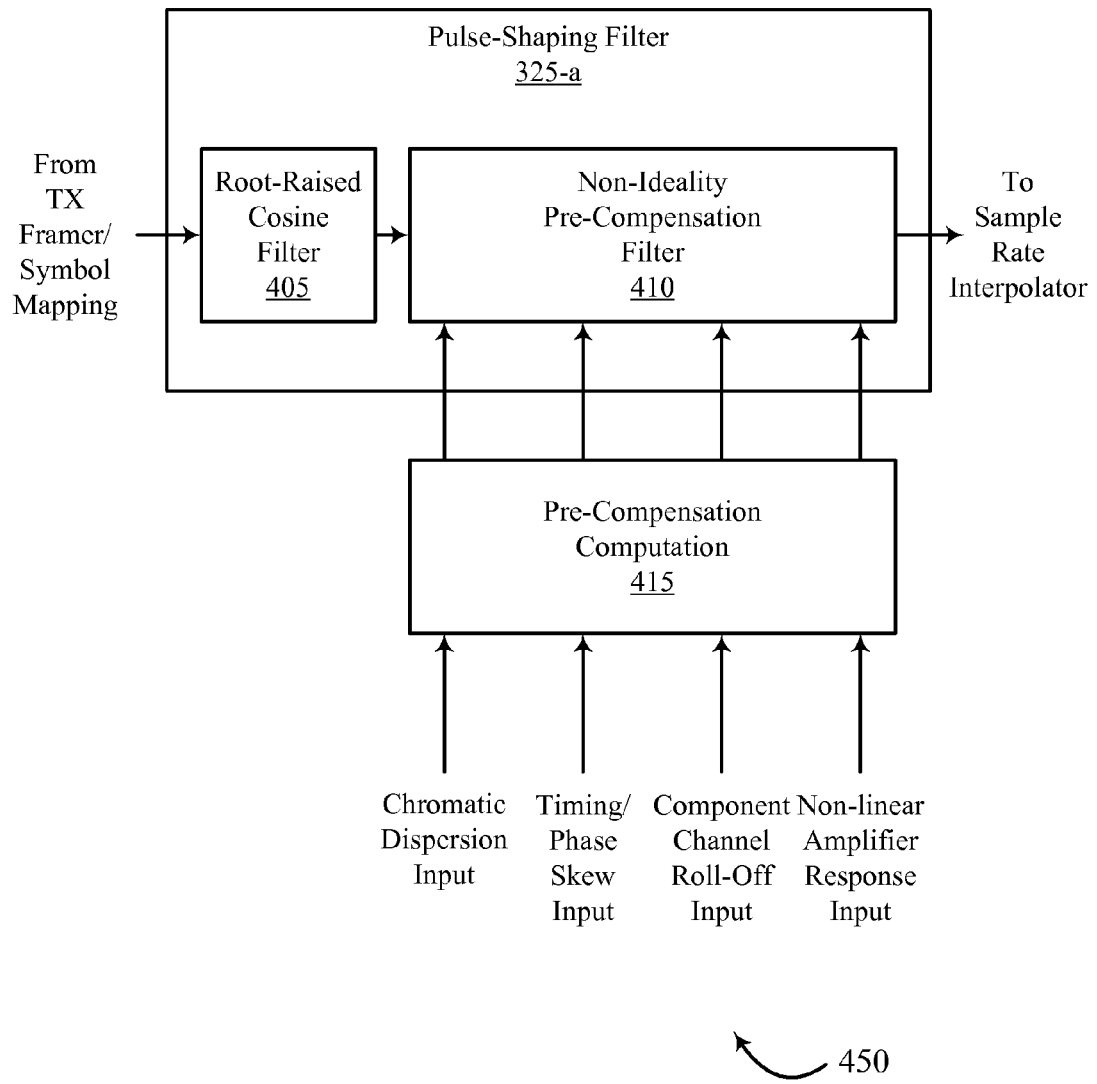
FIG. 4 is block diagram of an example of a pulse-shaping filter module according to various embodiments of the principles described herein.

FIG. 4, a system 450 is shown in which a pulse-shaping filter module 325-a is coupled to a pre-compensation computation module 415. The pulse-shaping filter module 325-a may be an example of the pulse-shaping filter module 325 described above with reference to FIG. 3.

The pulse-shaping filter module 325-a may include a root-raised cosine filter module 405 and a non-ideality pre-compensation filter module 410. The root-raised cosine filter module 405 may filter incoming streams of symbol-mapped bits (e.g., pulses of high and low voltages) to form the bits into a root-raised cosine shape. This root-raised cosine filter module 405 may reduce the bandwidth of the streams, thereby reducing inter-symbol interference. Additionally or alternatively, other types of pulse-shaping filters may be used, including, but not limited to, boxcar filters, sinc filters, raised-cosine filters, Gaussian filters, and the like.

The non-ideality pre-compensation filter module 410 may filter the streams of symbol-mapped bits in the digital domain to compensate for one or more predicted, determined, or known non-ideal transmission conditions. The non-ideality pre-compensation filter module 410 may receive input regarding chromatic dispersion in the signal path, input regarding timing phase or skew occurring in the signal path, input regarding component channel roll-off in the transmitter or receiver, and input regarding non-linear amplifier response in either the transmitter or the receiver. In other embodiments, input regarding more or fewer non-ideal transmission conditions may be received at the non-ideality pre-compensation filter module 410.

The input received by non-ideality pre-compensation filter module 410 may be used to generate a filtering function in the digital domain which is substantially inverse to a measured, a determined, or a predicted effect of the non-ideal transmission condition(s) to mitigate the detrimental effects of the identified non-ideal transmission conditions. In certain examples, the substantially inverse filtering functions may be pre-programmed or retrievable in memory. Additionally or alternatively, the input may include filter tap coefficients that weight certain aspects of one or more pulse-shaping filters to pre-compensate for the identified non-ideal transmission condition(s). The input may be received directly from an external application or process or statically stored in a register. In certain examples, the input may include active feedback and/or measurements received by one or more components within the signal path of the optical signal. For example, a first device may transmit an optical signal to a second device, and the second device may measure one or more non-ideal transmission conditions based on the received optical signal and transmit the measurements or other feedback based on the measurements back to the first device.

In certain examples, the root-raised cosine filter module 405 and the non-ideality pre-compensation filter module 410 may be implemented by a single discrete filter for each stream of symbol-mapped bits. Alternatively, the symbol-mapped bits may be sequentially filtered by a root-raised cosine filter and a non-ideality pre-compensation filter. In certain examples, the order in which each stream undergoes root-raised cosine filtering and non-ideality pre-compensation filtering may vary. In certain examples, the order of filtering may be dynamically modified to achieve a most favorable result. Moreover, in certain examples, a first stream (e.g., HI stream) of symbol-mapped bits may be passed through root-raised cosine filtering and non-ideality pre-compensation filtering in a different order than a second stream (e.g., VQ stream) of symbol-mapped bits.

The pre-compensation computation module 415 may receive input from an external application, process, or device and/or from one or more registers storing saved or default input regarding non-ideal transmission conditions. The input may be used by the pre-compensation computation module 415 to compute a set of filter tap coefficient values for a discrete pulse-shaping filter implementing at least the non-ideality pre-compensation filter module 410. In certain examples, the pre-compensation computation module 415 may compute the filter tap coefficient values based on a weighted consideration of the totality of the received input. Additionally or alternatively, the pre-compensation computation module 415 may compute the filter tap coefficient values based on a one-to-one correlation between non-ideal transmission conditions and filter tap coefficient values.

Figure 5:
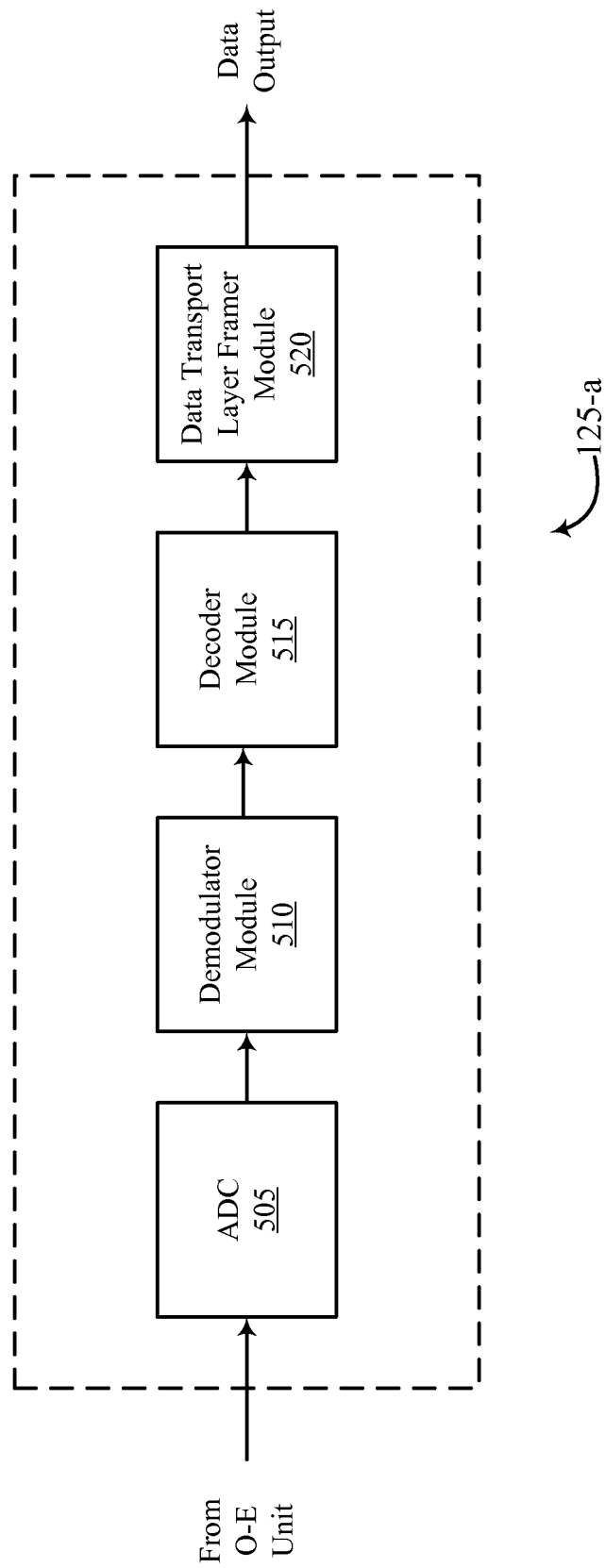
FIG. 5 is a block diagram of an example of a digital demodulation and decoding module according to various embodiments of the principles described herein.

As illustrated in FIG. 5, an example of a digital demodulation and decoding unit 125-a is shown. The digital demodulation and decoding unit 125-a may be an example of the digital demodulation and decoding unit 125 described above with reference to FIG. 1. In this embodiment, the digital demodulation and decoding unit 125-a includes an ADC 505, a demodulator module 510, a decoder module 515, and a data transport layer framer module 520. Each of these components may be in communication, directly or indirectly.

The ADC 505 may sample an electrical and analog version of an optical and analog signal received by an O-E unit (not shown). The optical signal from the E-O unit may have been transmitted at a data transmission rate of 40 Gbps or 100 Gbps, for example. Moreover, when the data from the optical signal is coherently received, phase information included in the optical signal is preserved after the O-E unit 120 transforms the data in the optical signal to the electrical domain. The ADC 505 may provide a digitally sampled version of the optical/analog signal to the demodulator module 510, which demodulates the digitally-sampled signal and provides the demodulated data to the decoder module 515. The demodulator module 510 may also compensate for non-ideal transmission conditions.

The decoder module 515 performs FEC decoding on the demodulated data, and may correct transmission errors identified from error-correcting code. The decoder module 515 provides the decoded and corrected data to the data transport layer framer module 520, which frames (or de-frames) the data from the signal according to the particular protocol used in the optical transmission, and provides output data. The data may be output to, for example, a user or any receiving system.

During FEC decoding, the decoder module 515 performs soft-decision decoding of the data received by the digital demodulation and decoding units 125-a and originally transmitted using a differentially-encoded 16 QAM scheme. The soft-decision FEC decoding uses a first reliability information for a subset of the bits of the recovered symbols and a second reliability information for a remaining subset of the bits of the recovered symbols. The first reliability information is based on LLR calculations used for soft-decision FEC decoding of data transmitted using differential QPSK. The second reliability information is based on LLR calculations used for soft-decision FEC decoding of data transmitted using coherent 16-QAM. The second reliability information may be pre-calculated and accessed from a lookup table. The symbols are then soft-decision decoded by using hard-decision data as well as the first reliability information and the second reliability information.

Figure 6:
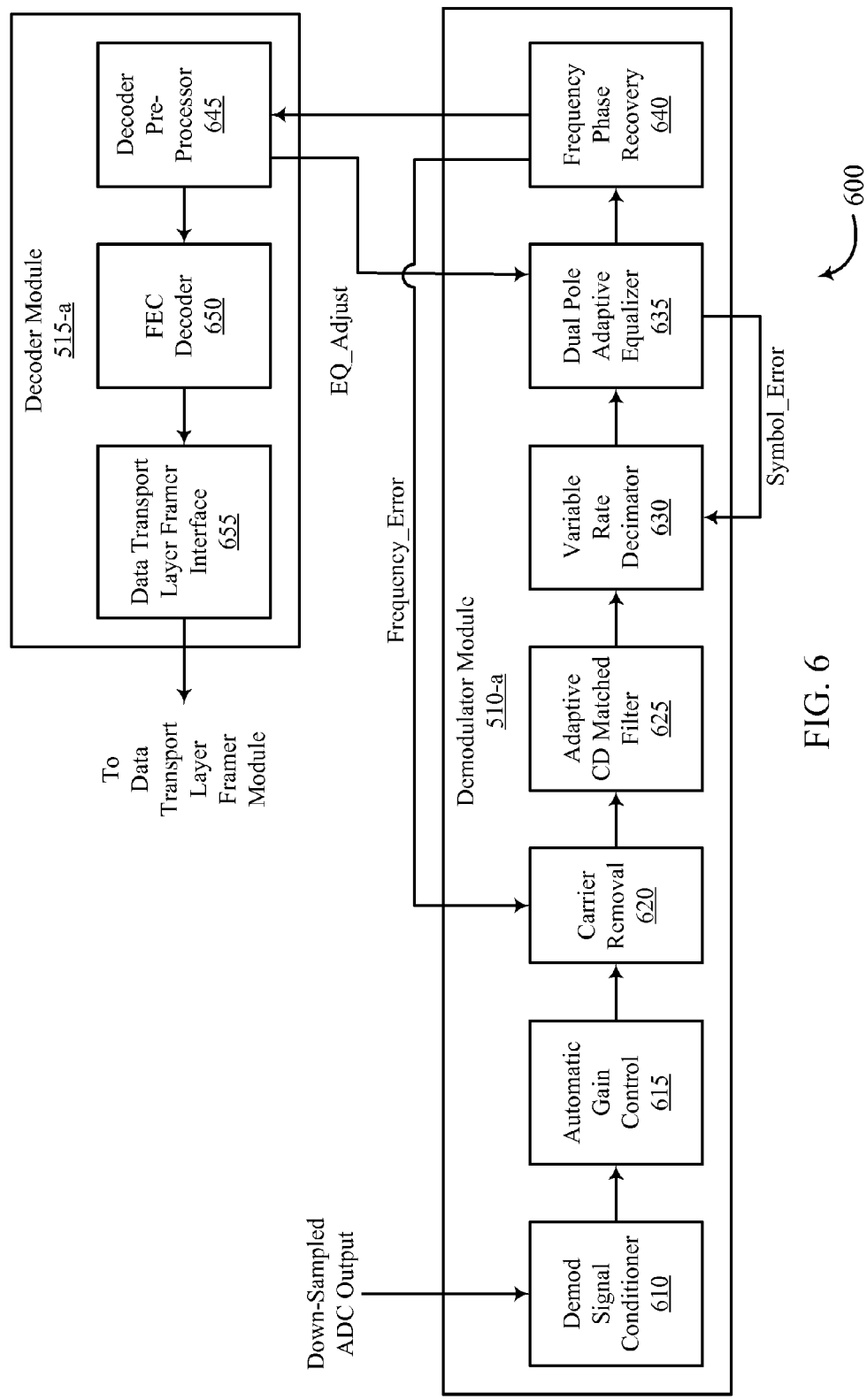
FIG. 6 is a block diagram of an example of a demodulator and a decoder according to various embodiments of the principles described herein.

FIG. 6 is a block diagram of a system 600 that includes a demodulator module 510-a and a decoder module 515-a. Each of these components may be in communication, directly or indirectly. The demodulator module 510-a and the decoder module 515-a may be respective examples of the demodulator module 510 and the decoder module 515 described above with reference to FIG. 5.

The demodulator 510-a may include a demodulator signal conditioner module 610, an automatic gain control module 615, a carrier removal module 620, an adaptive chromatic dispersion (CD) matched filter module 625, a variable rate decimator 630, a dual pole adaptive equalizer module 635, and a frequency phase recovery module 640.

Through the use of pulse-shaping to reduce inter-symbol interference and the effects of non-ideal transmission conditions, it may be possible to perform some of the filtering and other preliminary demodulation steps on a version of the optical signal that is sampled at or near the baud rate (e.g., the symbol rate) of the optical signal. However, an ADC that samples the optical signal at a rate of twice the symbol rate may be more readily obtainable and less expensive than an ADC that samples at or near the baud rate of the optical signal. Therefore, in some embodiments, an ADC that samples at twice the symbol rate may be used, and the output of the ADC may be down-sampled to just over the baud rate of the optical signal (e.g., between 1.0 and 1.3 times the baud rate).

The demodulator signal conditioner module 610 may receive the down-sampled version from the ADC and perform preliminary filtering on the received sampled version of the optical signal. The automatic gain control module 615 may automatically adjust the gain of the down-sampled version of the optical signal to bring the amplitude of the modulated carrier wave into an acceptable range. The carrier removal module 620 may then extract the symbol-mapped bits from the carrier frequency according to the modulation scheme used in the optical signal.

The adaptive CD matched filter 625 may filter the symbol-mapped bits to compensate for chromatic dispersion in the optical transmission path. In certain examples, the adaptive CD matched filter 625 may match one or more filters in the modulator of the device transmitting the optical signals. The variable rate decimator module 630 may adjust the sampling rate of the symbol-mapped bits such that each stream of symbol-mapped bits is at a sampling rate that will allow for minimal inter-symbol interference during equalization. In certain cases, the variable rate decimator module 630 may up-sample the extracted and filtered symbol-mapped bits to the original sample rate of the ADC (e.g., twice the symbol rate). The dual pole adaptive equalizer module 635 performs additional filtering on the streams of symbol-mapped bits in the digital domain to reduce inter-symbol interference and allow for the recovery of the modulated data. The dual pole adaptive equalizer module 635 may perform an inverse or matched filtering function of one or more pulse-shaping filters in the transmitter. The dual pole adaptive equalizer module 635 may be configured to support one or more polarizations in the modulation scheme.

After equalization is performed, the frequency phase recovery module 640 may recover the encoded bits based on symbols representing changes in the phase of the modulated carrier frequency. The encoded bits may be recovered from the symbols using information about the constellation diagram that is representative of the modulation scheme used to transmit the optical signal. In some embodiments, additional or separate modules may be used as appropriate to demodulate the encoded data from the recovered symbols.

The decoder module 515-a of the present example includes a decoder pre-processor module 645, an FEC decoder module 650, and a data transport layer framer interface module 655. Each of these components may be in communication, directly or indirectly.

The decoder pre-processor module 645 may enforce a set of rules to ensure the integrity and validity of the encoded data received from the demodulator module 510-a. The FEC decoder module 650 may perform forward error correction on the encoded bits to identify and correct errors and reconstruct the originally transmitted stream of data.

The FEC decoder module 650 may support a decoding technique such as TPC decoding or LDPC decoding, for example. During FEC decoding, the FEC decoder module 650 performs soft-decision FEC decoding of data transmitted using differential 16 QAM. The FEC decoder module 650 determines a first reliability information for a subset of the bits of the symbols recovered by the demodulator module 510-a. The FEC decoder module 650 also determines a second reliability information for a remaining subset of the bits of the symbols recovered by the demodulator module 510-a. The FEC decoder module 650 determines the first reliability information based on LLR calculations used for soft-decision FEC decoding of data transmitted using differential QPSK. The FEC decoder module 650 determines the second reliability information is based on LLR calculations used for soft-decision FEC decoding of data transmitted using coherent 16-QAM. The second reliability information may be pre-calculated, stored, and accessed from a lookup table. The symbols are then soft-decision decoded by using hard-decision data as well as the first reliability information and the second reliability information to reconstruct the originally transmitted stream of data. The data transport layer framer interface 655 may forward the originally transmitted stream of data to a data transport layer framer for processing and delivery.

Figure 7:
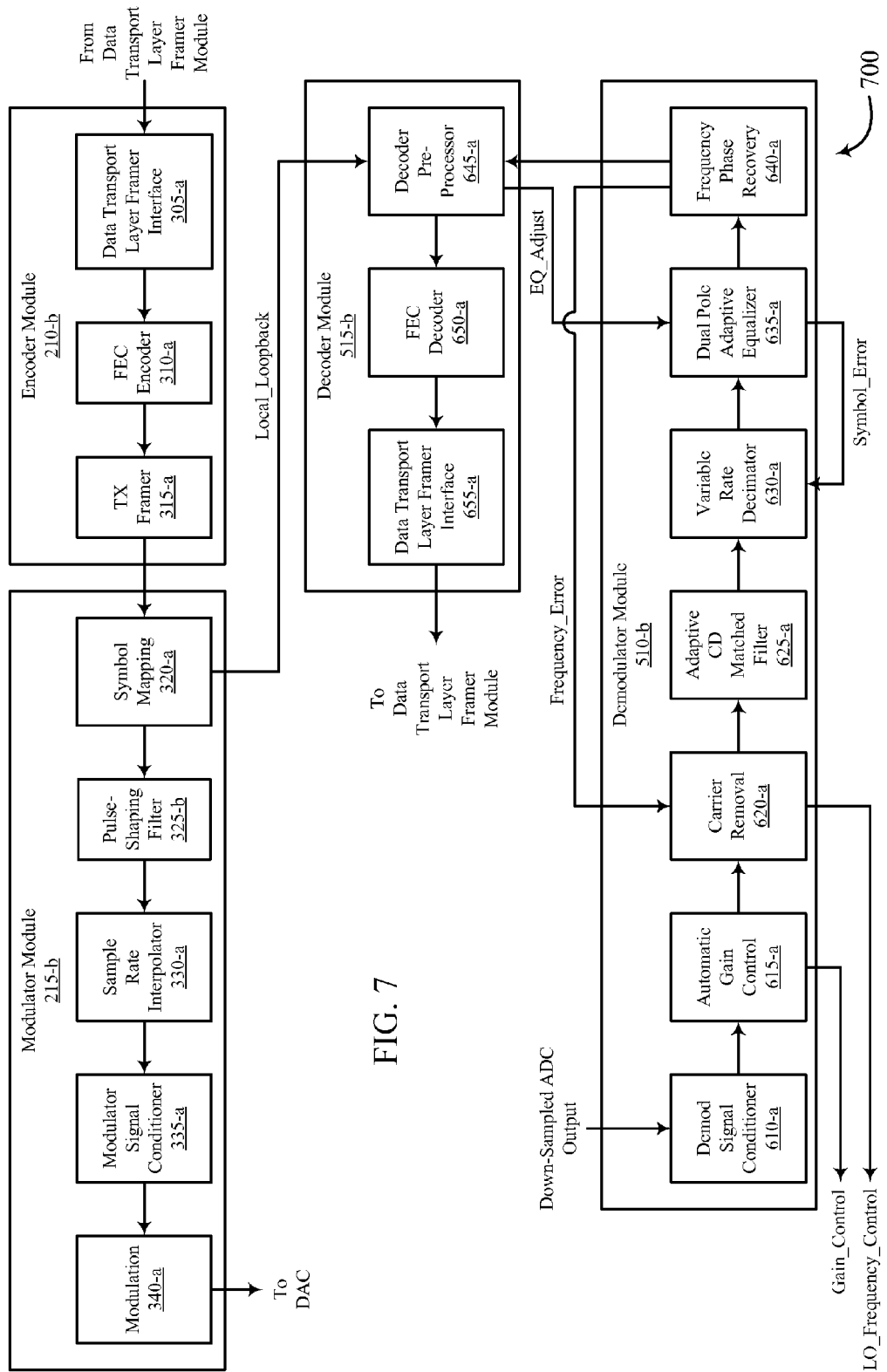
FIG. 7 is a block diagram of an example of an optical modem according to various embodiments of the principles described herein.

FIG. 7 illustrates a block diagram of an example of a modem device 700. The modem 700 includes an encoder module 210-b, a modulator module 215-b, a demodulator module 510-b, and a decoder module 515-b. The encoder module 210-b may be an example of the encoder modules 210 and 210-a described above with reference to FIG. 2 and FIG. 3, respectively. The modulator module 215-b may be an example of the modulator modules 215 and 215-a described above with reference to FIG. 2 and FIG. 3, respectively. The demodulator module 510-b may be an example of the demodulator modules 510 and 510-a described above with reference to FIG. 5 and FIG. 6, respectively. The decoder module 515-b may be an example of the decoder modules 515 and 515-a described above with reference to FIG. 5 and FIG. 6, respectively.

The encoder module 210-b may include a data transport layer framer interface module 305-a, an FEC encoder module 310-a, and a TX framer module 315-a. These components may be examples of the data transport layer framer interface module 305, the FEC encoder module 310, and the TX framer module 315 described above with reference to FIG. 3. The modulator module 215-b may include a symbol mapper module 320-a, a pulse-shaping filter module 325-b, a sample rate interpolator module 330-a, a modulator signal conditioner module 335-a, and a modulation module 340-a. These components may be examples of the symbol mapper module 320, the pulse-shaping filter module 325, the sample rate interpolator module 330, the modulator signal conditioner 335, and the modulation module described above with reference to FIG. 3. Additionally, the pulse-shaping filter 325-b may be an example of the pulse-shaping filter 325-a described above with reference to FIG. 4.

The demodulator module 510-b of the example in FIG. 7 may include a demodulator signal conditioner module 610-a, an automatic gain control module 615-a, a carrier removal module 620-a, an adaptive CD matched filter module 625-a, a variable rate decimator module 630-a, a dual pole adaptive equalizer module 635-a, and a frequency phase recovery module 640-a. These components may be examples of the demodulator signal conditioner module 610, the automatic gain control module 615, the carrier removal module 620, the adaptive CD matched filter module 625, the variable rate decimator module 630, the dual pole adaptive equalizer module 635, and the frequency phase recovery module 640 described above with reference to FIG. 6.

The decoder module 515-b may include a decoder pre-processor module 645-a, an FEC decoder module 650-a, and a data transport layer framer interface 655-a. These components may be examples of the decoder pre-processor module 645, the FEC decoder module 650, and the data transport layer framer interface module 655 described above with reference to FIG. 6.

As shown in FIG. 7, components of the modulator module 215-b, the decoder module 515-b, and the demodulator module 510-b may interact with each other. For example, the symbol mapper module 320-a of the modulator module 215-b may provide local loopback feedback signal (Local_Loopback) to the decoder pre-processor module 645-a to increase the accuracy of the decoder pre-processor module 645-a. The decoder pre-processor module 645-a may provide an equalizer adjustment feedback signal (EQ_Adjust) to the dual pole adaptive equalizer 635-a of the demodulator 510-b to dynamically adjust the equalization filtering at the demodulator module 510-c.

The frequency phase recovery module 640-a of the demodulator module 510-b may provide a frequency error signal (Frequency_Error) to the carrier removal module 620-a to allow the carrier removal module 620-a to achieve frequency lock with the carrier frequency. The dual pole adaptive equalizer module 635-a may provide a symbol error feedback signal (Symbol_Error) to the variable rate decimator module 630-a to allow the variable rate decimator module 630-a to dynamically adjust the sampling rate and reduce inter-symbol interference. The carrier removal module 620-a may provide a local oscillator frequency control signal (LO_Frequency_Control) to correct the frequency of a local oscillator signal that is used to demodulate the received optical signal. Additionally, the automatic gain control 615-a may provide a gain control signal (Gain_Control) that is based on the gain being applied to the amplitude of the modulated carrier wave.

Figure 8B:
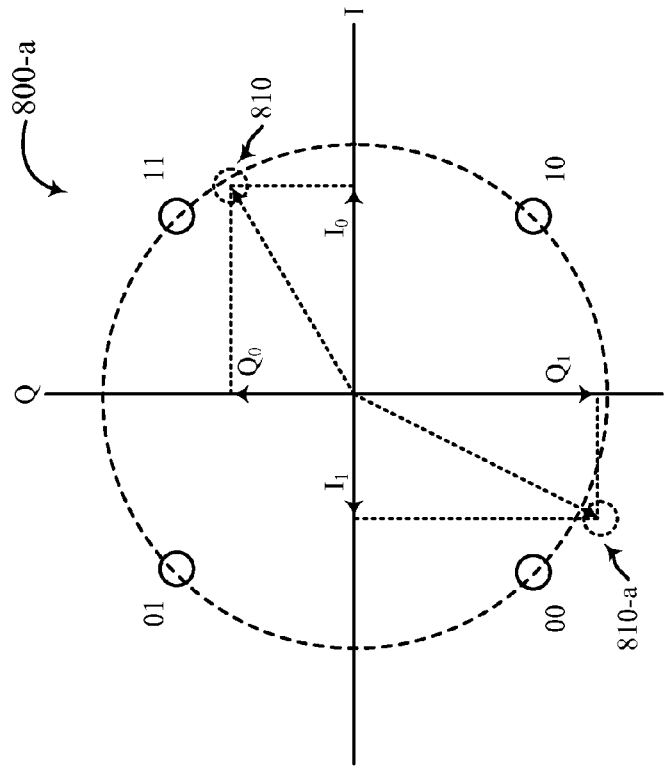
FIG. 8B is a diagram that illustrates an example of soft-decision forward error correction (FEC) reliability information for coherently-encoded QPSK according to various embodiments of the principles described herein.
Figure 8A:
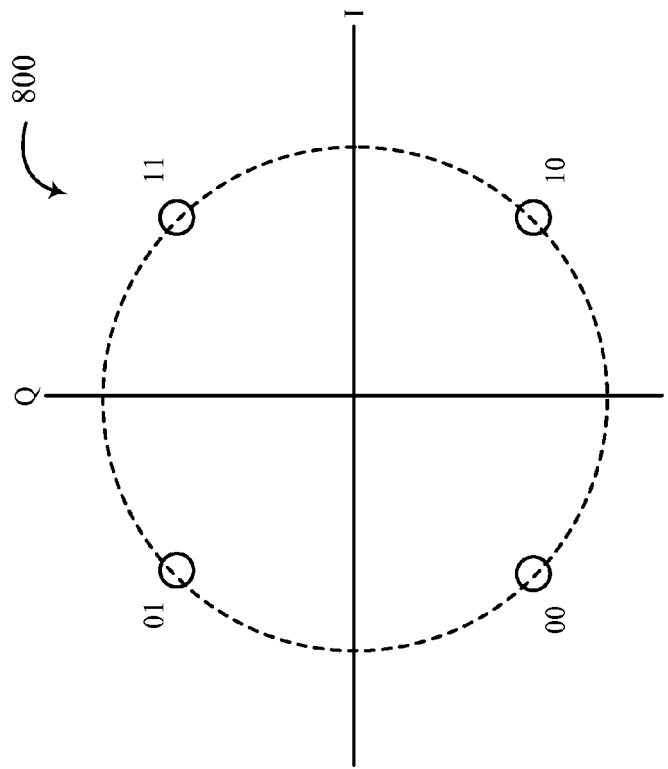
FIG. 8A is a diagram that illustrates an example of a Quadrature Phase-Shift Keying (QPSK) constellation according to various embodiments of the principles described herein.

FIG. 8A shows an example of a QPSK constellation diagram. The constellation diagram 800 represents a typical QPSK modulation scheme in which four symbols are equally spaced on a circle that is centered at the origin of a complex plane defined by a quadrature (Q)-axis and an in-phase (I)-axis. There are two bits mapped to each symbol and the symbols are Gray-coded such that only one bit changes between adjacent symbols. The symbols corresponding to the bit pairs (11), (01), (00), and (11) are respectively located on the circle at 45°, 135°, 225°, and 315° relative to the positive I-axis. Each bit pair is therefore located within one of the four quadrants of the complex plane. The constellation diagram 800 may be used for differentially-encoded as well as coherently-encoded QPSK data transmissions. Higher-order modulation schemes, such as differentially-encoded and coherently-encoded 16-QAM, may use a symbol arrangement that is based on the constellation diagram 800.

For QPSK data encoded using an FEC code, soft-decision FEC decoding may be used to obtain the estimates of the original data. Soft-decision FEC decoding, however, involves the use of hard-decision data and additional information (e.g., soft inputs) to indicate to an FEC decoder the level of reliability of the hard-decision data. The reliability information enables the FEC decoder to generate better estimates of the original data when correcting for errors during transmission. Reliability information is generally represented by a four-bit or six-bit value having both a sign and a magnitude. For example, for a four-bit value, the reliability information may range from −7 to +7. When a hard-decision bit under consideration is a "1", a reliability value of +7 may indicate that the "1" is a very strong "1", while a reliability value of +1 may indicate that is more likely than not that the "1" is in fact a "1".

FIG. 8B shows a constellation diagram 800-a that illustrates an example of soft-decision FEC reliability information for coherently-encoded QPSK. Also shown are a recovered symbol 810 (dotted line) and a recovered symbol 810-b (dotted line). Each of the recovered symbols corresponds to data transmitted using coherent QPSK and encoded with an FEC code. For a coherent mode (i.e., coherent QPSK), the reliability information of a bit is typically proportional to the respective I component or respective Q component of the recovered symbols in the complex plane. For example, for the recovered symbol 810, which is represented by ($I_0$,$Q_0$), the $I_0$ and the $Q_0$ are the reliability values for the bit pair corresponding to that recovered symbol. Similarly, for the recovered symbol 810-a, which is represented by ($I_1$,$Q_1$), the $I_1$ and the $Q_1$ are the reliability values for the bit pair corresponding that recovered symbol. Each of the reliability values includes sign and magnitude information since the values of $I_0$, $Q_0$, $I_1$, and $Q_1$ are each represented in the complex plane by a vector (e.g., arrow) having a sign or direction and a magnitude. Once the reliability information is determined for the recovered symbols, it may be appropriately scaled to provide as soft inputs to the FEC decoder. The scaling may include scaling the values associated with the reliability information based on energy-per-symbol to noise power spectral density ratio ($E_S/N_0$) measurements.

Figure 8C:
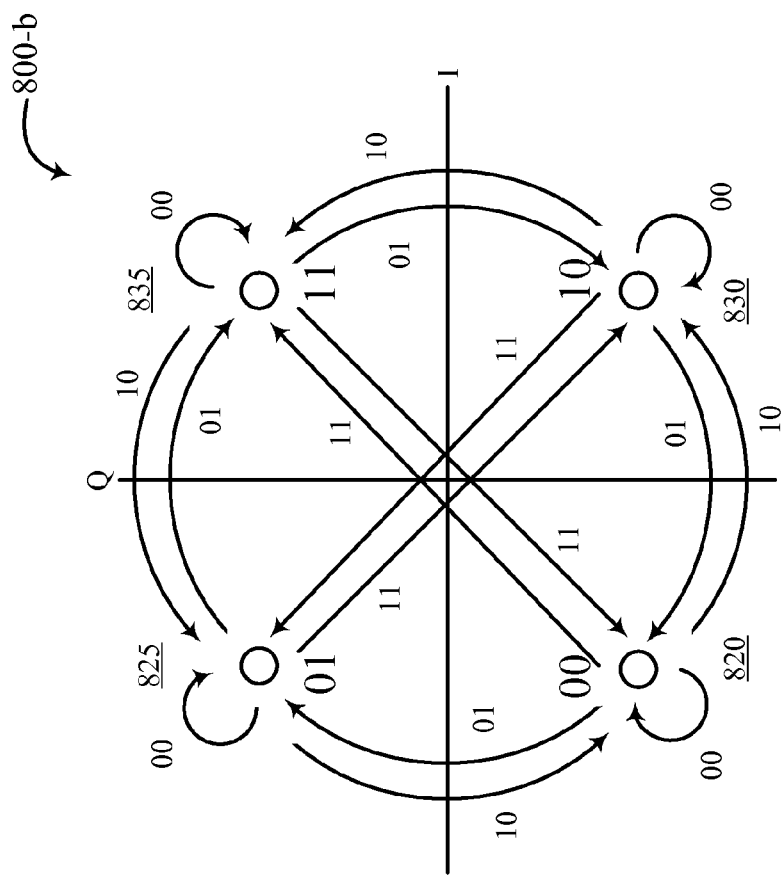
FIG. 8C is a diagram that illustrates an example of differentially-encoded QPSK according to various embodiments of the principles described herein.

Obtaining the reliability information for a differential mode (i.e., differential QPSK), however, may be more involved than for the coherent mode described above. FIG. 8C shows a constellation diagram 800-b for a differentially-encoded QPSK scheme. For ease in description herein, (DI, DQ) may be used to represent the output differentially-encoded QPSK symbols from a differential decoder (e.g., demodulator module 510-a). The transition between the constellation symbols are decided by the input symbols, (CI, CQ) to a differential encoder (e.g., modulator module 215-a). Vertical and horizontal polarizations may be treated separately.

The differential encoder may follow these rules:
Initialization: assume the previous transmitted symbol pattern is bit pair (00) (reference number 820), so ($DI_{-1}$, $DQ_{-1}$)= (−0.707, −0.707)
If the input symbol ($CI_0$,$CQ_0$) to the differential decoder at time 0 is:
  Bit pair (00) (reference number 820): no rotation is applied, ($DI_0$,$DQ_0$)=(−0.707, −0.707).
  Bit pair (01) (reference number 825): 90° clockwise rotation is applied, ($DI_0$,$DQ_0$)=(−0.707, 0.707).
  Bit pair (10) (reference number 830): 90° counter-clockwise rotation is applied, ($DI_0$,$DQ_0$)=(0.707, −0.707).
  Bit pair (11) (reference number 835): 180° rotation is applied, ($DI_0$,$DQ_0$)=(0.707, 0.707).
Let's assume the pattern for ($CI_0$,$CQ_0$) is bit pair (10) (reference number 830), so ($DI_0$,$DQ_0$)=(0.707, −0.707). If the input symbol ($CI_1$,$CQ_1$) to the differential decoder is:
  Bit pair (00) (ref. num. 820): no rotation is applied, ($DI_1$, $DQ_1$)=(0.707, −0.707).
  Bit pair (01) (ref. num. 825): 90° clockwise rotation is applied, ($DI_1$,$DQ_1$)=(−0.707, −0.707).
  Bit pair (10) (reference number 830): 90° counter-clockwise rotation is applied, ($DI_1$,$DQ_1$)=(0.707, 0.707).
  Bit pair (11) (reference number 835): 180° rotation is applied, ($DI_1$,$DQ_1$)=(−0.707, 0.707).

The encoding may be performed continuously following the method described above. An example code for a differential encoder is given here:

```
DI[0]=CI[0];
DQ[0]=CQ[0];
for (i=1;i<sym_length;i++){
  fix=(DI[i-1]^ DQ[i-1]) & (CI[i]^ CQ[i]);
  DI[i]=(DI[i-1]^CQ[i])^fix;
  DQ[i]=(DQ[i-1]^CQ[i])^fix;
}
```

The differential decoding may be performed in each polarization after coherent QPSK detection. The hard decisions of ($CI_i$, $CQ_i$) may be made based on judging the most likely transition between each pair of consecutively received symbols, ($DI_{i-1}$, $DQi_{-i}$) and ($DI_i$, $DQ_i$) (e.g., noise corrupted at the receiver). Table 1 below provides an example of a summary of the hard decision cases:

TABLE 1

Hard Decision Decoding

| Case index | ($DI_{i-1}$, $DQi_{-1}$) | ($DI_i$,$DQ_i$) | ($CI_i$, $CQ_i$) |
|---|---|---|---|
| 0 | 00 | 00 | 00 |
| 1 | 00 | 01 | 01 |
| 2 | 00 | 10 | 10 |
| 3 | 00 | 11 | 11 |
| 4 | 01 | 00 | 01 |
| 5 | 01 | 01 | 11 |
| 6 | 01 | 10 | 00 |
| 7 | 01 | 11 | 10 |
| 8 | 10 | 00 | 10 |
| 9 | 10 | 01 | 00 |
| 10 | 10 | 10 | 11 |
| 11 | 10 | 11 | 01 |
| 12 | 11 | 00 | 11 |
| 13 | 11 | 01 | 10 |
| 14 | 11 | 10 | 01 |
| 15 | 11 | 11 | 00 |

An example of code that may be used to generate the hard decisions shown in Table 1 is given here:

```
dspi=(DI[0]>=0);
dspq=(DQ[0]>=0);
for (i=1;i<symbol_length;i++){
  dsci=(DI[i]>=0);
  dscq=(DQ[i]>=0);
  fix=(dspi^dspq) & (!dsci^dscq);
  c1=(dspi^dsci)^fix;
  c2=(dspq^dscq)^fix;
  dspi=dsci; dspq=dscq;
}
```

To obtain the reliability information for differential QPSK, an ML estimator may perform LLR calculations that may be used as soft inputs to an FEC decoder. The general equation for LLR is:

$$LLR_{b_{11}} = \frac{\Sigma P(b_i = 1)}{\Sigma P(b_i = 0)} \quad \text{Eq. 1}$$

For example, the bit $CI_i$ cases 2, 3, 5, 7, 8, 10, 12, and 13 in Table 1 correspond to a hard decision of $CI_i$=1, and the rest of the cases correspond to a hard decision of $CI_i$=0. So, using Eq. 1, the LLR can be calculated as follows:

$$LLR_{CI_i} = \frac{P(00,10) + P(00,11) + P(01,01) + P(01,11) + P(10,00) + P(10,10) + P(11,00) + P(11,01)}{P(00, 00) + P(00, 01) + P(01, 00) + P(01, 10) + P(10, 01) + P(10, 11) + P(11, 10) + P(11, 11)} \quad \text{Eq. 2}$$

Here P(($DI_{i-1}$, $DQi_{-1}$), ($DI_i$, DQi)) represents the probability of a transition from ($DI_{i-1}$, $DQ_{i-1}$) to ($DI_i$, $DQ_i$). A total of 16 terms are involved in the computation, so the computational complexity may be high. However, this may be simplified by identifying the dominating terms in computing the LLR and basing the LLR calculating only on those dominating terms. A similar approach may be used regarding the cases for $CQ_i$=1 and $CQ_i$=0. Once the reliability information is calculated, it may be used as soft inputs for soft-decision FEC decoding of data transmitted using differential QPSK (i.e., differential mode).

Figure 8D:
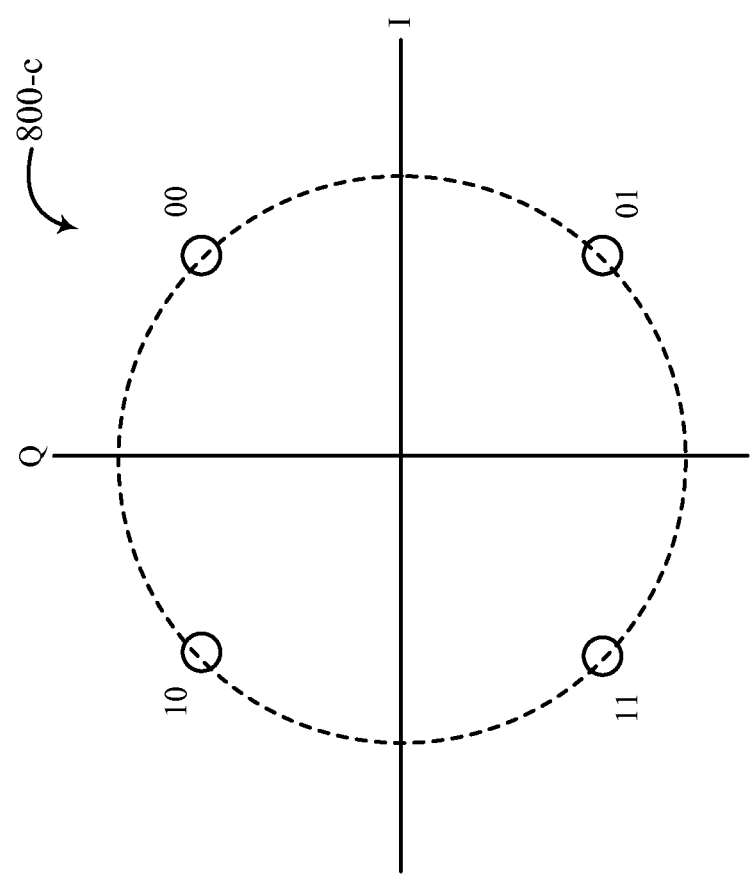
FIG. 8D is a diagram that illustrates an example of a QPSK constellation for generating LLRs in differentially-encoded 16-QAM according to various embodiments of the principles described herein.

FIG. 8D shows a constellation diagram 800-c that illustrates another example of a QPSK constellation. This QPSK constellation, along with others described herein, may be used when simplifying the computation of LLRs for differentially-encoded bits in differentially-encoded 16-QAM, or in differentially encoded QPSK. The constellation diagram 800-c may represent or map the top two bits (i.e., the differentially-encoded bits) of a differentially-encoded 16-QAM constellation (see FIG. 10B). A differential encoding scheme used with the constellation diagram 800-c may define the changes from a previous symbol to a current symbol as follows: (a) a rotation of 180° corresponds to symbol or bit pair (00); (b) a rotation of 270° corresponds to symbol or bit pair (01); (c) a rotation of 90° corresponds to symbol or bit pair (10); and (d) a rotation of 0° corresponds to symbol or bit pair (11). It should be noted that these definitions are provided for illustrative purposes and that other definitions may be used when differentially encoding data using a QPSK constellation (see, e.g., FIG. 8C).

The logic or process of generating LLRs for differentially-encoded bits may include identifying the critical or dominating probability terms in the computation. The computation may then be simplified by retaining the dominating terms and discarding any other terms that provide a small or negligible contribution to the results of the computation.

In one example, when differential encoding using the constellation diagram 800-c results in a previous (or old) symbol (00) transitioning to a current (or new) symbol (00), the recovered symbol is expected to be (11) because the rotation between the previous and current symbols is 0°. The expected symbol has a most significant bit (MSB) of "1" and a least significant bit (LSB) of "1". To generate the reliability (i.e., soft decision information) for such a case, the following approach may be taken.

For the MSB of the expected symbol, if the previous symbol had been (01) instead of (00), which corresponds to a 90° rotation from (01) to the current symbol (00), the recovered symbol would be instead (10). The previous symbol may be (01) instead of (00) because of an error decoding that symbol, for example. Note that the MSB is the same (MSB=1) in both cases (i.e., when previous symbol is (00) or (01)). That is, the value of MSB does not change when the value of the I component of the previous symbol is the same. On the other hand, if the transition is from a previous symbol (10) to the current symbol (00), which corresponds to a 270° rotation, the recovered symbol would instead be (01). Again, the previous symbol may be (10) instead of (00) because of an error decoding that symbol, for example. Note that the value of the expected symbol MSB is different in both cases (i.e., MSB=1 when the previous symbol is (00) and MSB=0 when the previous symbol is (10)). That is, the value of MSB changes when the value of the I component of the previous symbol changes. Therefore, looking at the constellation diagram 800-*c*, when transitioning to the current symbol (00), the I component of the previous symbol is the important or critical component of the previous symbol and the Q component of the previous symbol is not as important or critical. In other words, for this particular transition in the constellation diagram 800-*c*, it may be possible to identify the MSB value of the expected symbol by looking at the I component. Thus, for the MSB, the I component of the previous (old) symbol is the important term of the previous symbol that needs to be considered for the LLR computations.

By analyzing the current (new) symbol in a similar way as described above, for the MSB of the expected symbol in this particular transition, the Q component of the current symbol is the important term of the current symbol that needs to be considered for the LLR computations. Therefore, when determining the reliability of the MSB, the I component of the previous symbol and the Q component of the current symbol may be used.

A similar analysis for the LSB of the expected symbol in this particular transition may indicate that the Q component of the previous symbol and the I component of the current symbol may be the critical or important components to use when determining the reliability of the LSB.

The analysis described above may be applied to all 16 possible transitions in the constellation diagram 800-*c*. This mechanism of selecting the important terms (e.g., probability terms) for a particular transition based on whether the I or Q component of the previous symbol is important and whether the I or Q component of the current symbol is important may provide improvements in the decoding of differentially-encoded QPSK data, which may be used for decoding of differentially-encoded 16-QAM data.

An example of code that may be used to implement the mechanism described above is provided below:
% Sign of the previous (p) and current (c) i and q
dspi=(i<0);
dspq=(j<0);
dsci=(i1<0);
dscq=(j1<0);
% Magnitude of the previous (p) and current (c) i and q
dmpi=abs(i);
dmpq=abs(j);
dmci=abs(i1);
dmcq=abs(j1);
fix2=xor(dspi,dspq);
fix3=xor(fix2,xor(dsci,dscq));
x_old=dmpi*fix3+dmpq*(1−fix3);
y_old=dmpi*(1−fix3)+dmpq*fix3;
a=min(x_old,dmci)−c*log(1+exp(−abs(x_old−dmci)/c));
b=min(y_old,dmcq)−c*log(1+exp(−abs(y_old−dmcq)/c));
llr_b3=(2*dspi−1)*(2*(dsci*fix2+dscq*(1−fix2))−1)*
(a*fix2+b*(1−fix2)); % MSB
llr_b2=(2*dspq−1)*(2*(dscq*fix2+dsci*(1−fix2))−1)*(a*
(1−fix2)+b*fix2); % LSB.

Figure 9:
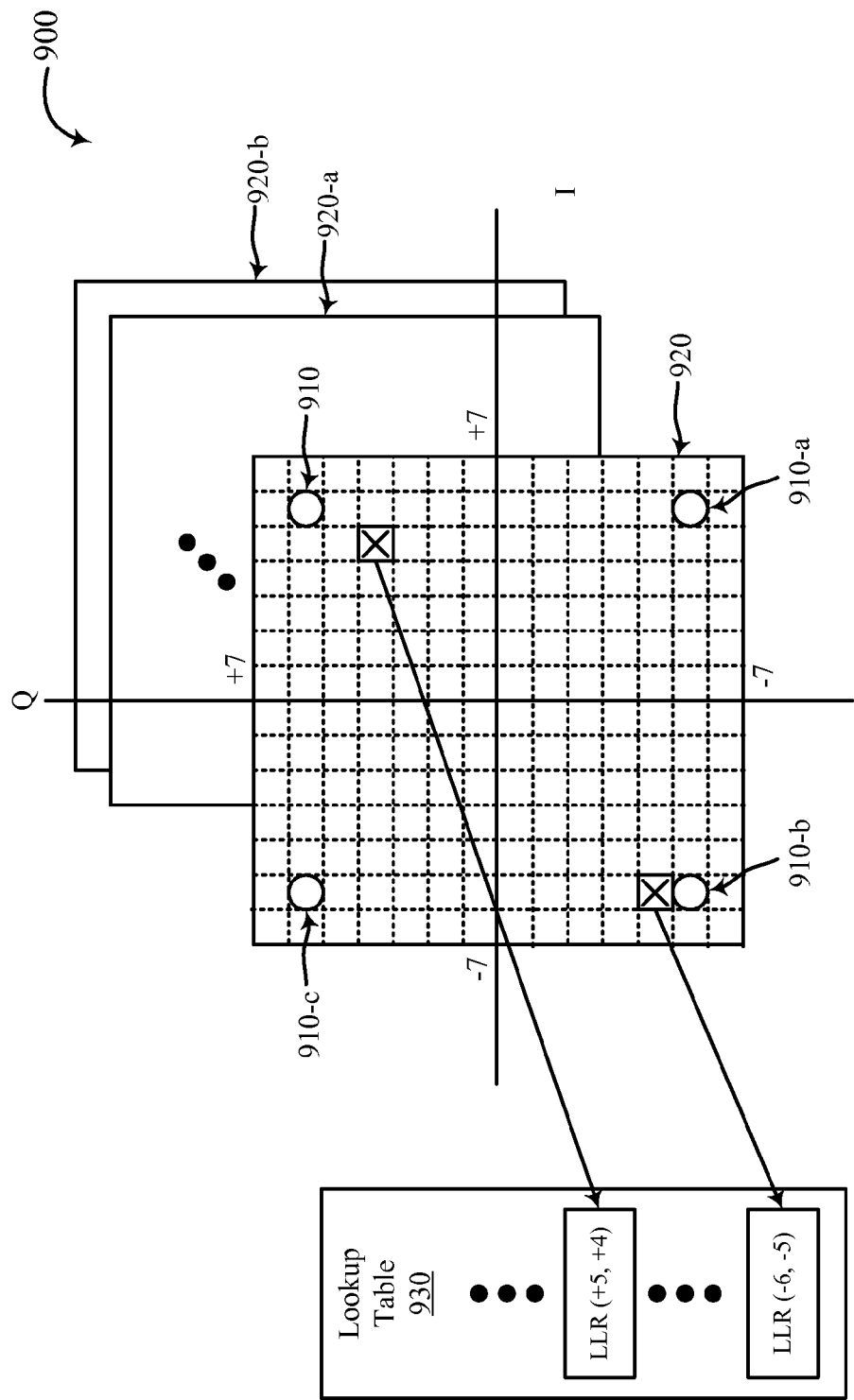
FIG. 9 is a diagram that illustrates an example of using a lookup table with soft-decision FEC reliability information for coherently-encoded QPSK according to various embodiments of the principles described herein.

FIG. 9 shows a diagram 900 that illustrates an example of using a lookup table with soft-decision FEC reliability information for coherently-encoded QPSK. In this example, symbols 910, 910-*a*, 910-*b*, and 910-*c* represent the typical locations of symbols in a QPSK constellation diagram like the constellation diagram 800 of FIG. 8A. A region 920 corresponds to a quantized portion of the complex plane within which recovered QPSK symbols are typically located. In this example, the quantization is based on four-bit I and Q values that allow the region 920 to have quantized locations ranging from −7 to +7 along the I-axis and from −7 to +7 along the Q-axis. In another example, if six-bit values were used, the region 930 may have quantized locations ranging from −31 to +31 along the I-axis and ranging from −31 to +31 along the Q-axis.

As noted above with reference to FIG. 8B, the reliability information for the each of the bits in coherently-encoded QPSK data is the corresponding I value or Q value of the recovered symbols. This approach is effectively the calculation of the LLRs for coherent QPSK. These values when scaled can be provided to an FEC decoder as soft input. The values may be scaled based on $E_S/N_0$ measurements. To simplify the process, the scaled I and Q values may be calculated and stored in a lookup table 930, which may be integrated within the FEC decoder. In the example of FIG. 9, two recovered symbols, one at location (+5,+4) and the other at location (−6,−5) in the quantized region 920 can have their reliability information determined from data stored in the lookup table 930.

Because the processing associated with symbol recovery and handling is typically parallelized, there may be multiple instances of quantized complex planes being considered at a time. FIG. 9 shows additional quantized regions/complex planes 920-*a* and 920-*b* to illustrate this point. While only three quantized regions/complex planes are shown, the number may typically be higher than that (e.g., 64 quantized regions/complex planes). Using a lookup table in coherent mode may be reasonable even when six-bit values are used because, in this mode, data is QPSK-modulated without having any dependency between consecutive bits or symbols. That is, the number of quantized locations for each complex plane being used in the process is approximately $2^{6+6}=2^{12}$, which may be reasonably implemented using a lookup table or some other form of local memory. On the other hand, for differential mode, the QPSK-modulated data depends on a previous bit or symbol. When six-bit values are used, the number of quantized locations for each complex plane in the process is approximately $2^{6+6+6+6}=2^{24}$, which may be difficult to implemented using a lookup table. Thus, the use of the lookup table 930 of FIG. 9 to simplify obtaining reliability information is more likely for coherently-encoded QPSK data than for differentially-encoded QPSK data.

Figure 10A:
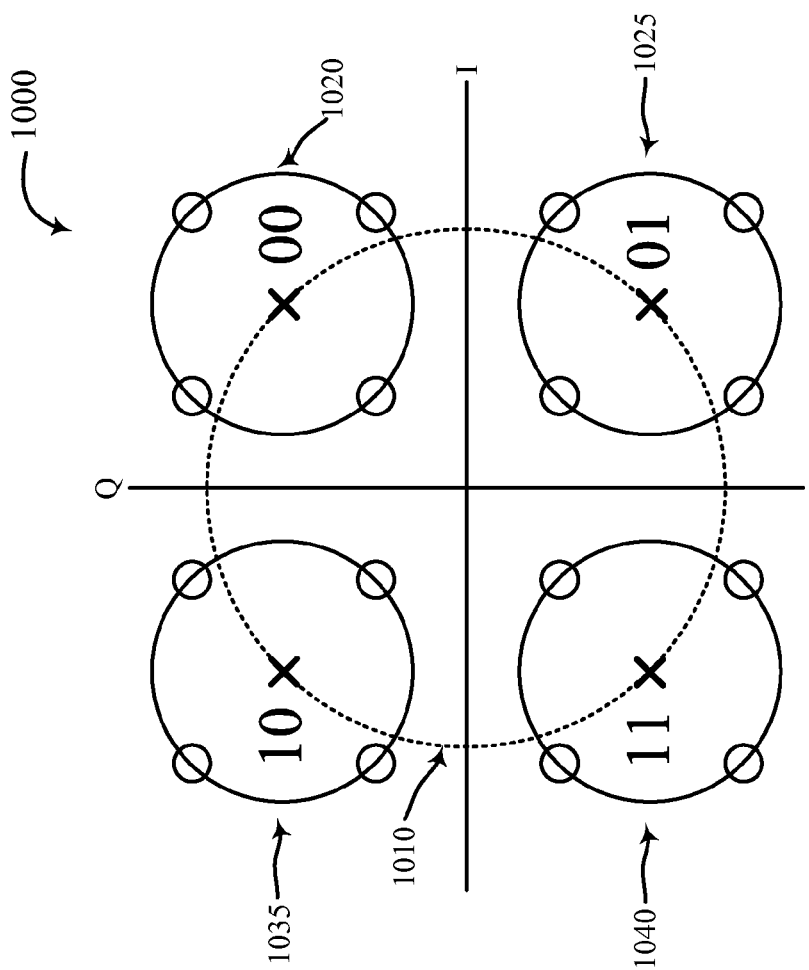
FIG. 10A is a diagram that illustrates an example of a constellation diagram for 16-QAM according to various embodiments of the principles described herein.

FIG. 10A shows a constellation diagram 1000 that illustrates an example of a 16-QAM constellation. In this example, the sixteen symbols of the 16-QAM constellation are constructed by first realizing a virtual QPSK constellation 1010 about the center of the complex plane. Then, each of the symbols (shown as Xs) of the virtual QPSK constellation 1010 serves as an origin for a smaller QPSK constellation. For example, at the symbol represented by bit pair (00) of the virtual QPSK constellation 1010, a smaller QPSK constellation 1020 (with symbols shown as circles) may be placed. Similarly for bit pairs (10), (11), and (01), where smaller QPSK constellations 1035, 1040, and 1025 may be placed, respectively. Once constructed, the constellation diagram 1000 includes the typical arrangement for the sixteen symbols of the 16-QAM constellation. Based on the constellation diagram 1000, differential 16-QAM may be described or defined as an overlay of a differential QPSK modulation on a coherent QPSK modulation.

The constellation diagram 1000 may be used in both a coherent mode (i.e., coherently-encoded 16-QAM) and in a differential mode (i.e., differentially-encoded 16-QAM) similar to the coherent and differential modes described above for QPSK. Each of these modes, like for QPSK, may have a different approach to calculating reliability information for soft-decision FEC decoding. For the coherent mode, for example, the reliability information may be obtained by using the general equation for LLR as shown in Eq. 1. In the coherent mode, the symbols of the constellation diagram 1000 may be Gray-coded (not shown) such that only one bit changes between adjacent symbols. Once calculated, the reliability information for coherently-encoded 16-QAM may be stored in a lookup table and accessed in a similar manner as described above for coherently-encoded QPSK. Obtaining the reliability information for a differential mode (i.e., differential 16-QAM) may be more involved than for the coherent mode. However, an approach that simplifies and effectively calculates the reliability information for differential 16-QAM is described below.

Figure 10B:
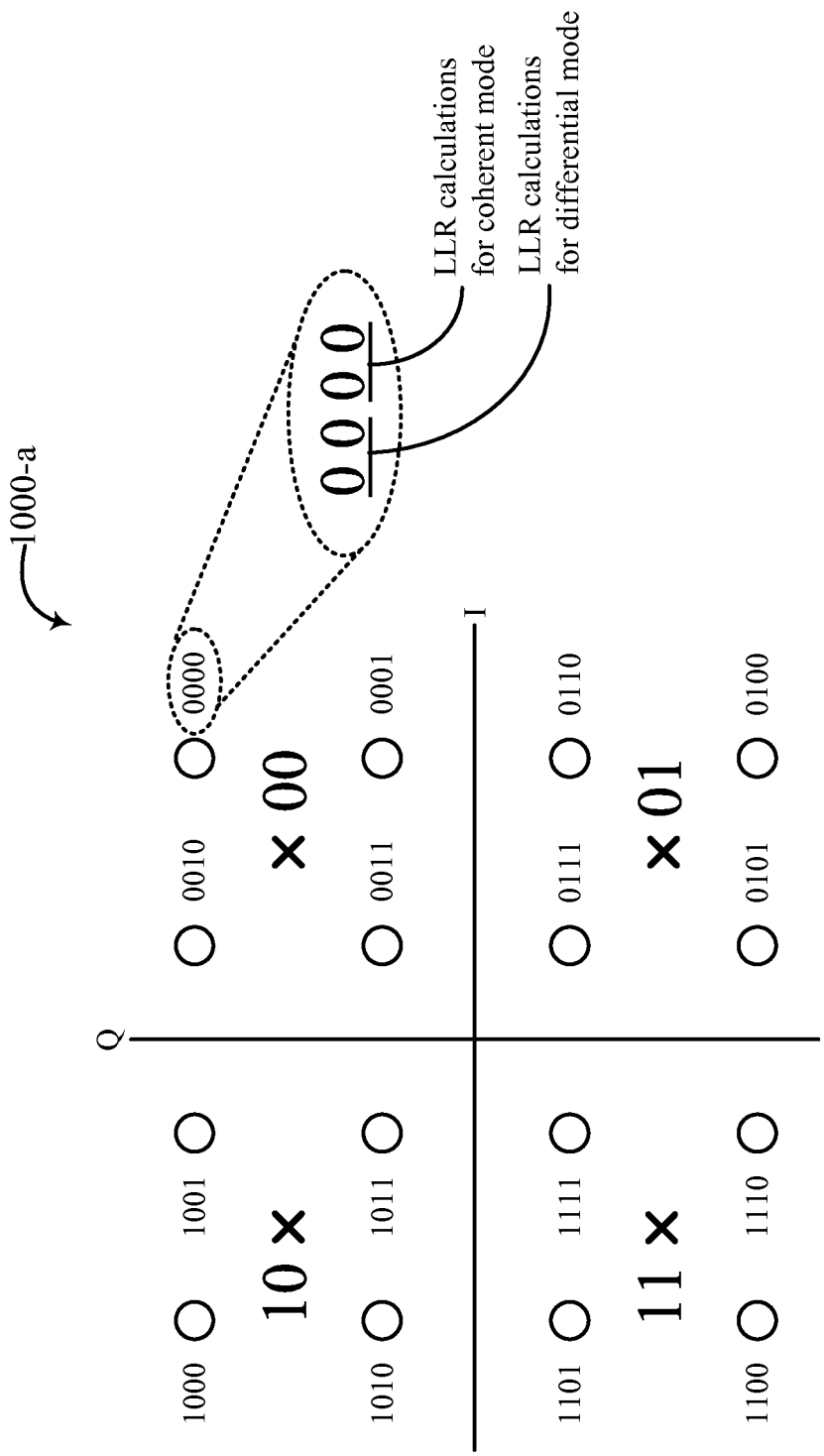
FIG. 10B is a diagram that illustrates an example of soft-decision FEC reliability information for differentially-encoded 16-QAM according to various embodiments of the principles described herein.

FIG. 10B shows a constellation diagram 1000-*a* that is an example of the constellation diagram 1000 of FIG. 10A. The constellation diagram 1000-*a* illustrates a 16-QAM constellation constructed in the manner described above in which four small QPSK constellations, one in each quadrant, are combined. For the small QPSK constellation in the first quadrant, the four symbols are represented by bit sets (0000) at the top-right, (0010) at the top-left, (0011) at the bottom-left, and (0001) at the bottom right. In this example, the other small QPSK constellations include their own symbol bit set patterns that are Gray-coded, however, the overall 16-QAM constellation is not Gray-coded.

To determine the reliability information needed for the four bits that correspond to a 16-QAM symbol, a simplified approach may use different reliability calculations for the first two bits (leftmost) and for the next two bits (rightmost). The first two bits may also be referred to as the two highest-order bits, while the next two bits may be referred to as the two lowest-order bits. As shown in FIG. 10B, the first two bits may have their reliability information calculated using LLR calculations for a differential mode. In this instance, because the small QPSK constellations are fixed relative to their quadrants, the LLR calculations for the differential mode may correspond to LLR calculations for differential QPSK. Examples of such calculations are described above with respect to FIG. 8C and FIG. 8D. Moreover, the next two bits may have their reliability information calculated using LLR calculations for a coherent mode. In this instance, the LLR calculations for the coherent mode may correspond to LLR calculations for coherent 16-QAM. As noted above, LLR calculations for coherent 16-QAM may be pre-calculated and stored in a lookup table to facilitate the calculation process. The approach of using different LLR calculations for different sets of bits for a symbol may greatly simplify the calculation of reliability information for differential 16-QAM. Once the reliability information for the first two bits and the reliability information for the next two bits are determined, they may be weighted and combined before provided for soft-decision FEC decoding.

Figure 11A:
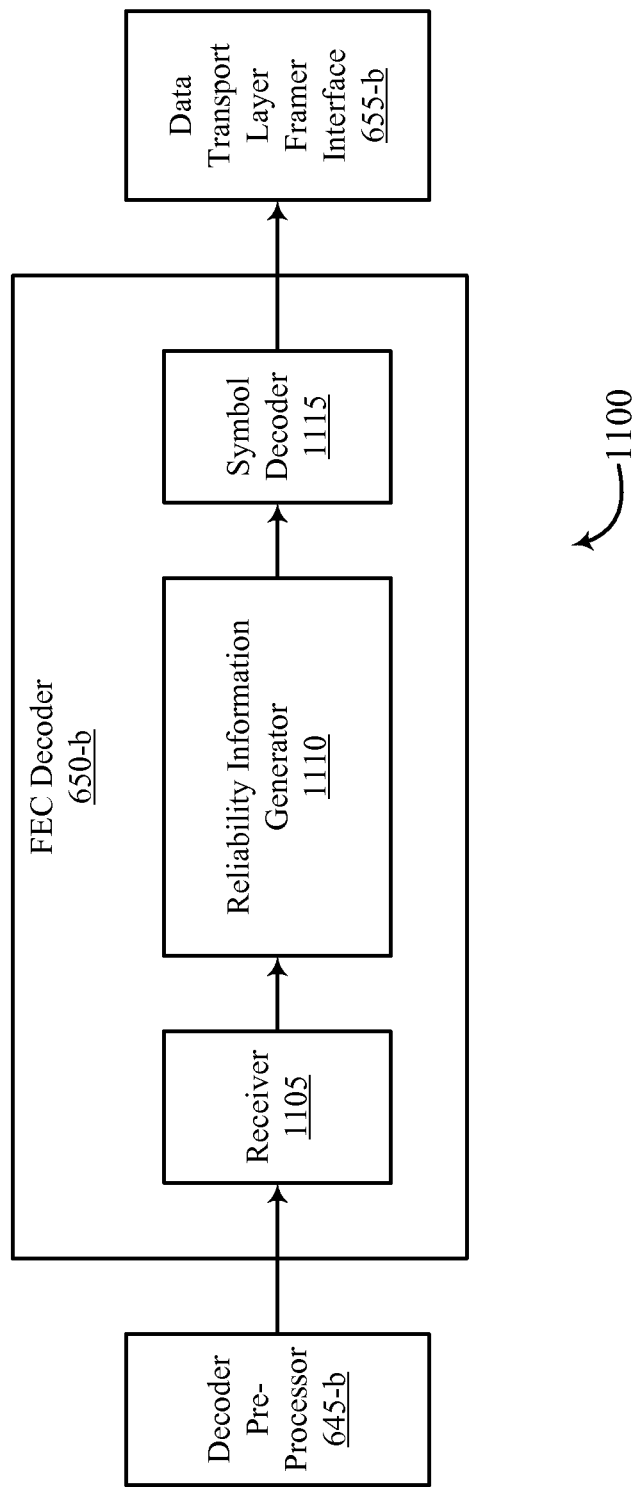
FIG. 11A is a block diagram that illustrates an example of an FEC decoder module for soft-decision FEC decoding of differentially-encoded 16-QAM according to various embodiments of the principles described herein.

FIG. 11A shows a decoder module 1100 for soft-decision FEC decoding of differentially-encoded 16-QAM. The decoder module 1100 includes a decoder pre-processor 645-*b*, an FEC decoder 650-*b*, and a data transport layer framer interface 655-*b* that may be respective examples of the decoder pre-processors 645 and 645-*a*, the FEC decoders 650 and 650-*a*, and the data transport layer framer interfaces 655 and 655-*a* of FIG. 6 and FIG. 7. The FEC decoder 650-*b* includes a receiver 1105, a reliability information generator 1110, and a symbol decoder 1115. Each of these components may be in communication, directly or indirectly.

The receiver 1105 may receive input symbols from the decoder pre-processor 645-*b*. The input symbols may be made up of in-phase and quadrature components for a given polarization. The reliability information generator 1110 may receive the symbols and may generate hard-decision data and reliability information to provide to the symbol decoder 1115. The reliability information generator 1110 may generate reliability information for differential 16-QAM based on the approach described above with reference to FIG. 10A and FIG. 10B. That is, the reliability information generator 1110 may generate a first reliability information for a subset of the bits of a symbol based on LLR calculations for differential QPSK, and may generate a second reliability information for a remaining subset of the bits based on LLR calculations for coherent 16-QAM. Because calculations for differential QPSK are supported by the reliability information generator 1110 to produce the first reliability information, the FEC decoder 650-*b* may be used for both soft-decision FEC decoding of differential 16-QAM and for soft-decision FEC decoding of differential QPSK. The reliability information generator 1110 may apply weighting factors to one or both of the first reliability information and the second reliability information before combining them and providing them to the symbol decoder 1115. The symbol decoder 1115 may correct for errors caused during transmission and may reconstruct the originally transmitted stream of data. The symbol decoder 1115 may provide the reconstructed stream of data to the data transport layer framer interface 655-*b*.

Figure 11B:
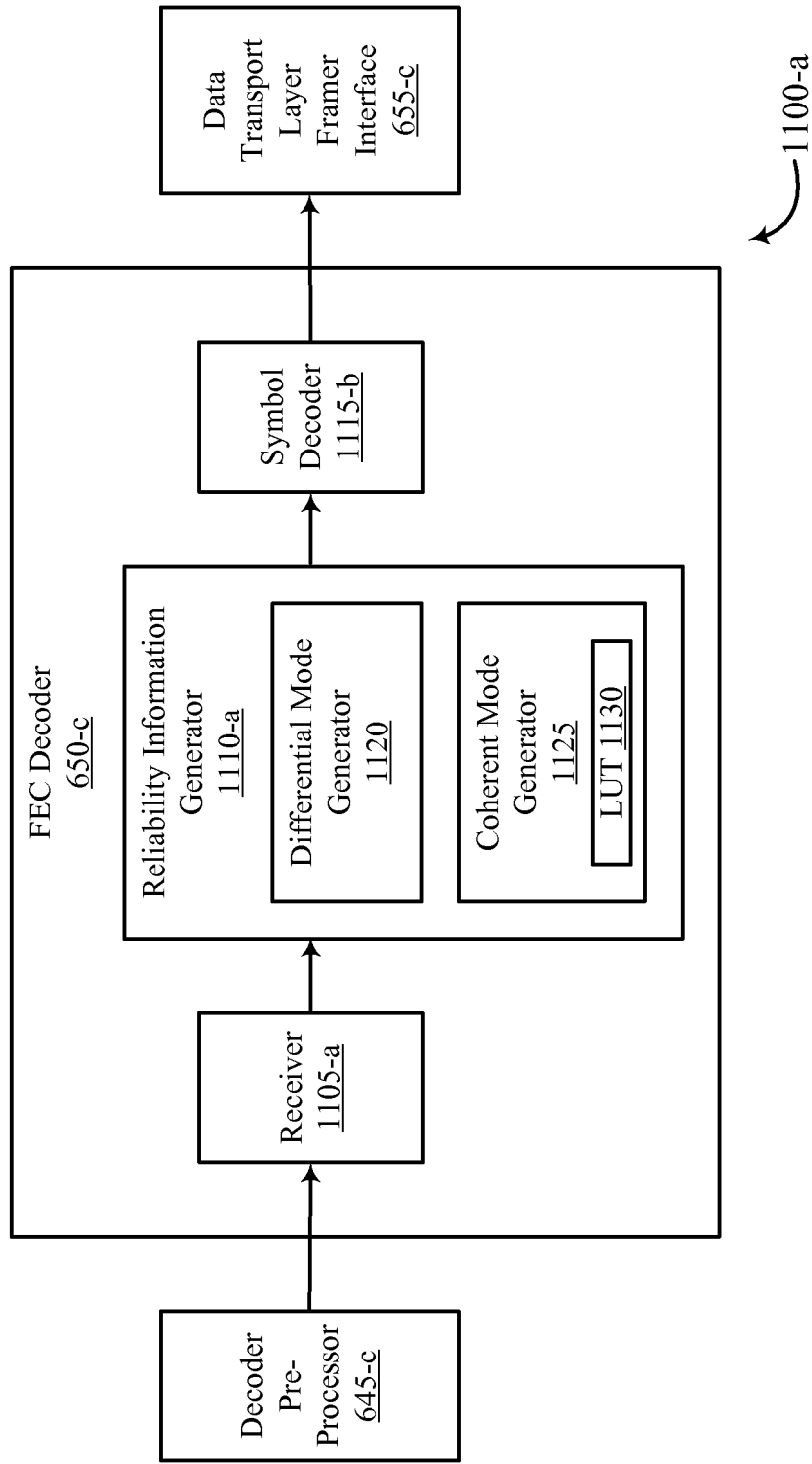
FIG. 11B is a block diagram that illustrates another example of an FEC decoder module for soft-decision FEC decoding of differentially-encoded 16-QAM according to various embodiments of the principles described herein.

FIG. 11B shows a decoder module 1100-*a* for soft-decision FEC decoding of differentially-encoded 16-QAM. The decoder module 1100-*a* includes a decoder pre-processor 645-*c*, an FEC decoder 650-*c*, and a data transport layer framer interface 655-*c* that may be respective examples of the decoder pre-processors 645, 645-*a*, and 645-*b*, the FEC decoders 650, 650-*a*, and 650-*b*, and the data transport layer framer interfaces 655, 655-*a*, and 655-*b* of FIG. 6, FIG. 7, and FIG. 11A. The FEC decoder 650-*c* includes a receiver 1105-*a*, a reliability information generator 1110-*a*, and a symbol decoder 1115-*a* that may be examples of the receiver 1105, the reliability information generator 1110, and the symbol decoder 1115 of FIG. 11A. The reliability information generator 1110-*a* includes a differential mode generator 1120 and a coherent mode generator 1120, which in turn includes a lookup table (LUT) 1130. Each of these components may be in communication, directly or indirectly.

The differential mode generator 1120 may generate a first reliability information for a subset of the bits of a recovered symbol based on LLR calculations for differential QPSK as described above with reference to FIG. 8C and FIG. 10B. In some embodiments, the differential mode generator 1120 includes one or more ML estimators (not shown) to determine the LLR calculations. The coherent mode generator 1125 and may generate a second reliability information for a remaining subset of the bits based on LLR calculations for coherent 16-QAM as described above with reference to FIG. 10A and FIG. 10B. In some embodiments, the coherent mode generator 1125 includes one or more ML estimators (not shown) to determine the LLR calculations. In some embodiments, the coherent mode generator 1125 accesses stored values for the LLR calculations from the LUT 1130.

In one operating mode of the FEC decoder 650-*c*, the differential mode generator 1120 is used to generate reliability information for soft-decision FEC decoding of differential 16-QAM. In this operating mode, the coherent mode generator 1125 also generates reliability information for soft-decision FEC decoding of differential 16-QAM. The reliability information from both generators is combined and provided to the symbol decoder 1115-b. When combined, a different weighting factor may be applied to the reliability information from each of the generators.

In another operating mode of the FEC decoder 650-c, the differential mode generator 1120 is used to generate reliability information for soft-decision FEC decoding of differential QPSK. In this operating mode, the coherent mode generator 1125 need not generate reliability information and may be disabled. The reliability information from the differential mode generator 1120 is provided to the symbol decoder 1115-b.

Figure 12A:
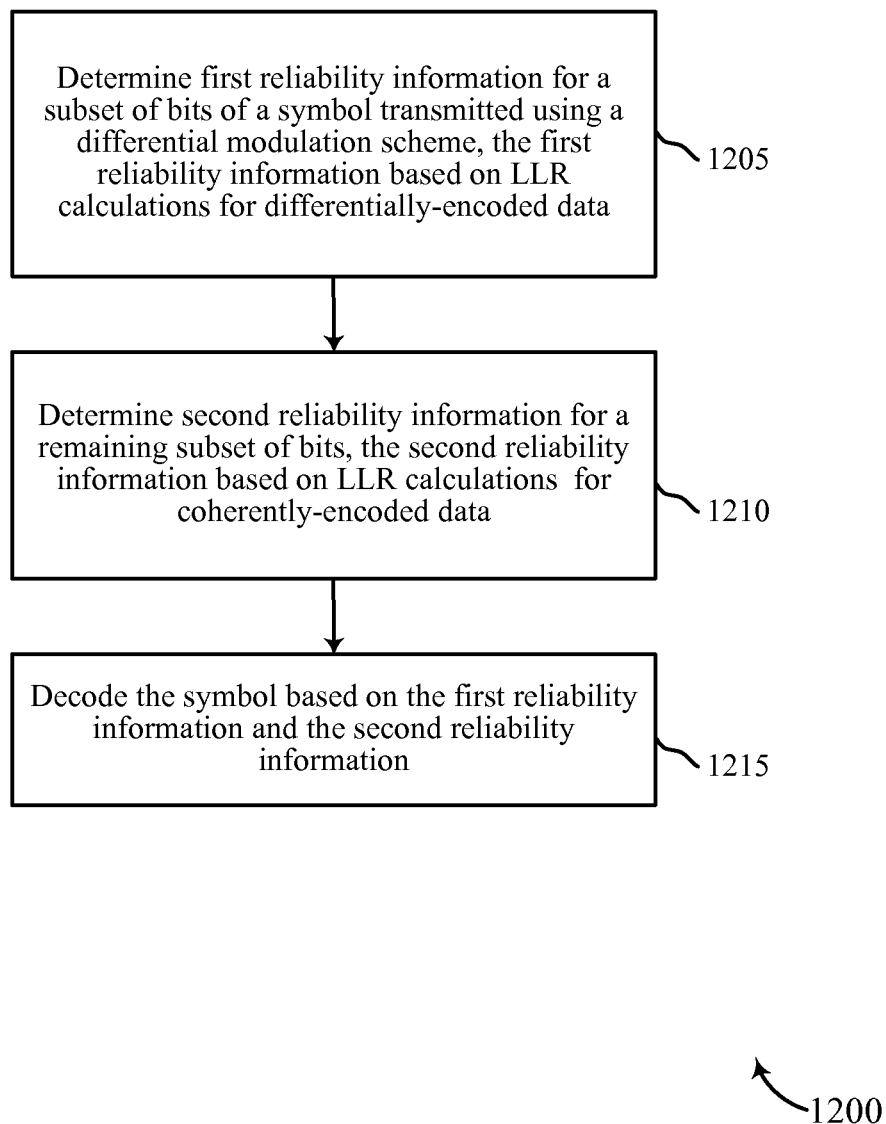
FIG. 12A is a flow chart of an example of a method for soft-decision FEC decoding data from optical signals according to various embodiments of the principles described herein.

FIG. 12A illustrates a flowchart diagram of an example method 1200 for soft-decision FEC decoding for differential 16-QAM. The method 1200 may be performed using, for example, the digital demodulation and decoding units 125 and 125-a of FIG. 1 and FIG. 5, respectively; the decoder modules 515, 515-a, and 515-b of FIG. 5, FIG. 6, and FIG. 7, respectively; the FEC decoders 650, 650-a, 650-b, and 650-c of FIG. 6, FIG. 7, FIG. 11A, and FIG. 11B, respectively; and/or the modem of FIG. 7.

At block 1205, a first reliability information is determined for a subset of the bits of a symbol transmitted using a differential modulation scheme. An example of a differential modulation scheme is differential 16-QAM. The first reliability information is based on LLR calculations for differentially-encoded data (e.g., reliability information generators 1110 and 1110-a, and differential mode generator 1120). An example of differentially-encoded data is differentially-encoded QPSK data. At block 1210, a second reliability information is determined for a remaining subset of the bits of the symbol transmitted using the differential modulation scheme. The second reliability information is based on LLR calculations for coherently-encoded data (e.g., reliability information generators 1110 and 1110-a, and coherent mode generator 1125). An example of coherently-encoded data is coherently-encoded 16-QAM data. At block 1215, the first reliability information and the second reliability information may be used to decode the symbol (e.g., symbol decoder 1115).

In some embodiments of the method 1200, the values associated with the reliability information are scaled based on $E_S/N_0$ measurements. In some embodiments, data corresponding to more than one symbol is de-interleaved after being interleaved for transmission. The de-interleaved data is then decoded based on the first reliability information and the second reliability information.

In some embodiments of the method 1200, a determination is made as to whether the differential modulation scheme is a differentially-encoded QPSK scheme and not a differentially-encoded 16-QAM scheme. When a differentially-encoded QPSK scheme is used, the first reliability information is determined but the second reliability information need not be determined. In this regard, the second reliability information may be discarded, ignored, or simply not calculated. Each symbol transmitted using the differentially-encoded QPSK scheme is then decoded using only the first reliability information.

Figure 12B:
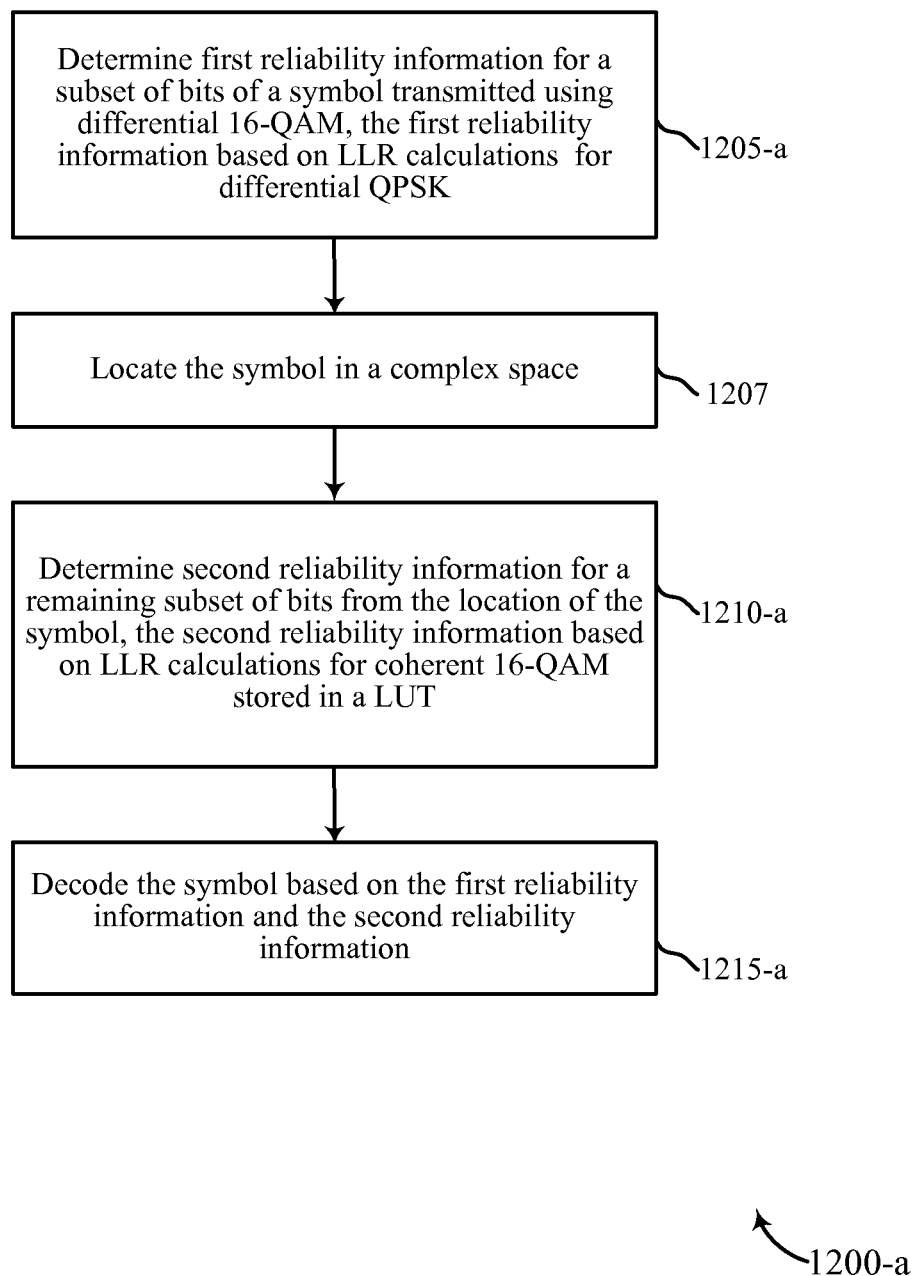
FIG. 12B is a flow chart of another example of a method for soft-decision FEC decoding data from optical signals according to various embodiments of the principles described herein.

FIG. 12B illustrates a flowchart diagram of an example method 1200-a for soft-decision FEC decoding for differential 16-QAM. The method 1200-a, like the method 1200 above, may be performed using, for example, the digital demodulation and decoding units 125 and 125-a of FIG. 1 and FIG. 5, respectively; the decoder modules 515, 515-a, and 515-b of FIG. 5, FIG. 6, and FIG. 7, respectively; the FEC decoders 650, 650-a, 650-b, and 650-c of FIG. 6, FIG. 7, FIG. 11A, and FIG. 11B, respectively; and/or the modem of FIG. 7.

At block 1205-a, a first reliability information is determined for a subset of the bits of a symbol transmitted using differential 16-QAM. The first reliability information is based on LLR calculations for differential QPSK. At block 1207, the symbol is located in a complex plane. The complex plane may be a quantized plane representative of the 16-QAM constellation. At block 1210-a, a second reliability information is determined for a remaining subset of the bits of the symbol transmitted using the differential 16-QAM. The second reliability information is based on LLR calculations for coherent 16-QAM and are obtained from a lookup table based on the location of the symbol in the complex plane. At block 1215-a, the first reliability information and the second reliability information may be used to decode the symbol.

Figure 12C:
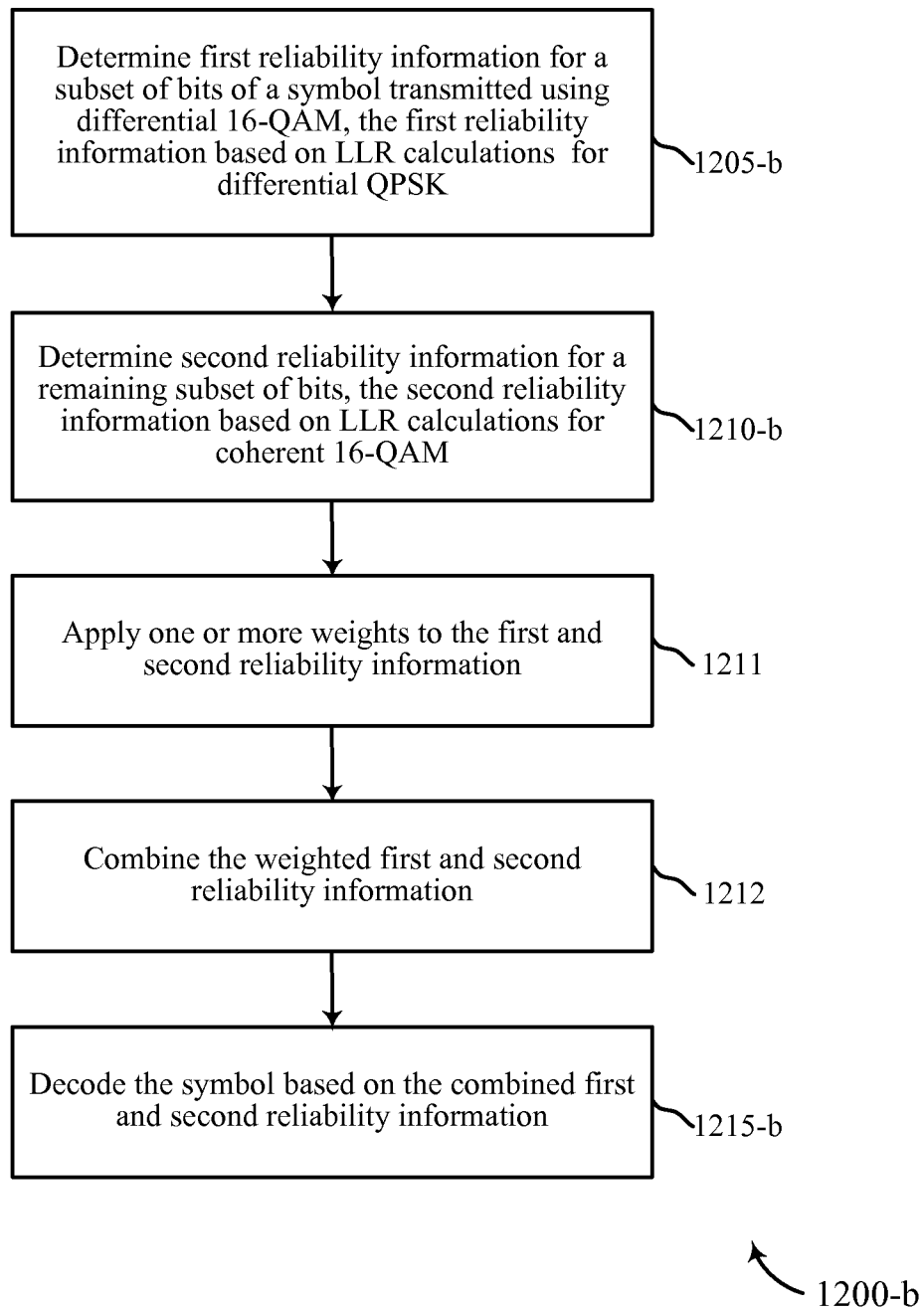
FIG. 12C is a flow chart of an example of a method for soft-decision FEC decoding data from optical signals according to various embodiments of the principles described herein.

FIG. 12C illustrates a flowchart diagram of an example method 1200-b for soft-decision FEC decoding for differential 16-QAM. The method 1200-b, like the methods 1200 and 1200-a above, may be performed using, for example, the digital demodulation and decoding units 125 and 125-a of FIG. 1 and FIG. 5, respectively; the decoder modules 515, 515-a, and 515-b of FIG. 5, FIG. 6, and FIG. 7, respectively; the FEC decoders 650, 650-a, 650-b, and 650-c of FIG. 6, FIG. 7, FIG. 11A, and FIG. 11B, respectively; and/or the modem of FIG. 7.

At block 1205-b, a first reliability information is determined for a subset of the bits of a symbol transmitted using differential 16-QAM. The first reliability information is based on LLR calculations for differential QPSK. At block 1210-b, a second reliability information is determined for a remaining subset of the bits of the symbol transmitted using the differential 16-QAM. The second reliability information is based on LLR calculations for coherent 16-QAM and are obtained from a lookup table based on the location of the symbol in the complex plane. At block 1211, one or more weights or weighting factors are applied to the first reliability information and/or to the second reliability information. At block 1212, the weighted first reliability information and second reliability information are combined. At block 1215-b, the combined first reliability information and second reliability information may be used to decode the symbol.

Figure 13:
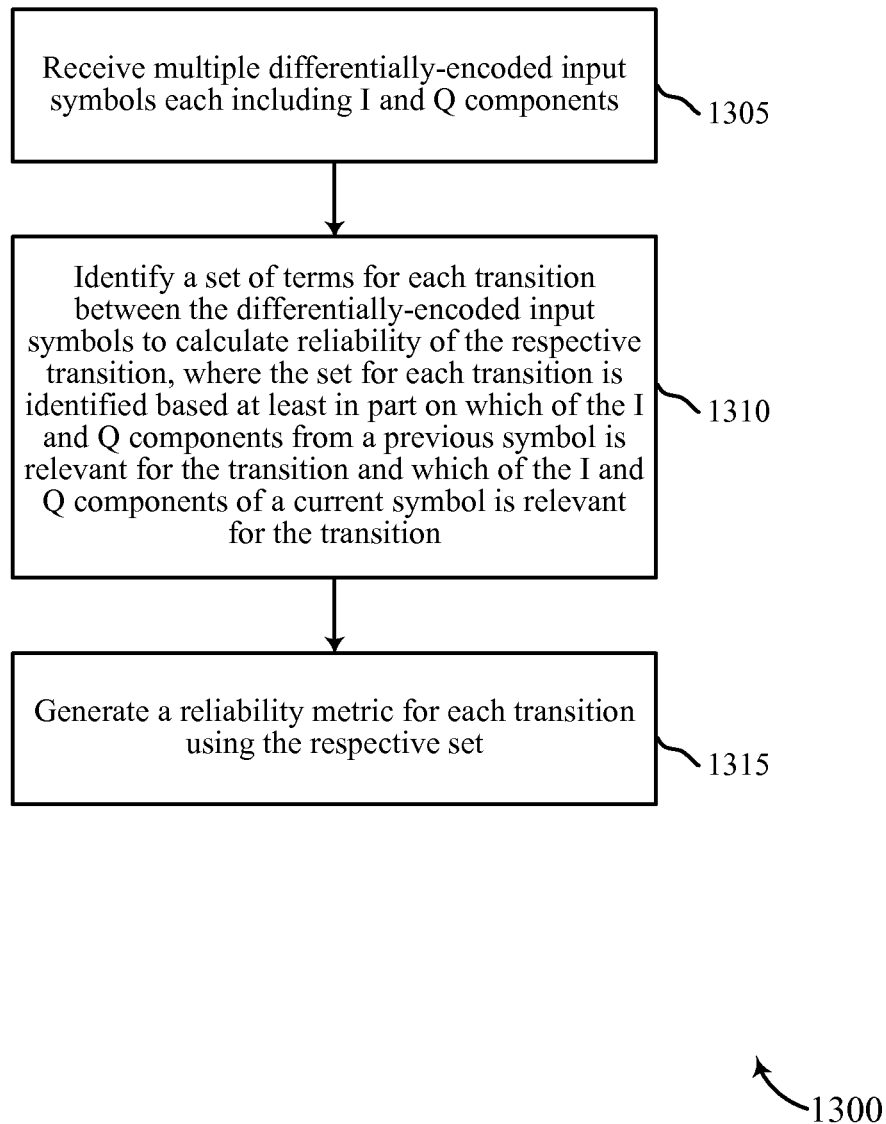
FIG. 13 is a flow chart of an example of a method for soft decision differential decoding according to various embodiments of the principles described herein.

FIG. 13 illustrates a flowchart diagram of an example method 1300 for soft decision differential decoding. The method 1300 may be performed using, for example, the digital demodulation and decoding units 125 and 125-a of FIG. 1 and FIG. 5, respectively; the decoder modules 515, 515-a, and 515-b of FIG. 5, FIG. 6, and FIG. 7, respectively; the FEC decoders 650, 650-a, 650-b, and 650-c of FIG. 6, FIG. 7, FIG. 11A, and FIG. 11B, respectively; and/or the modem of FIG. 7.

At block 1305, multiple differentially-encoded input symbols are received each having I and Q components. At block 1310, a set of terms for each transition between the differentially-encoded input symbols is identified to calculate reliability of the respective transition, where the set for each transition is identified based at least in part on which of the I and Q components from a previous symbol is relevant for the transition and which of the I and Q components of a current symbol is relevant for the transition. At block 1315, a reliability metric is generated for each transition using the respective set. FIG. 8D described above provides examples of some or all of the features associated with the method 1300 of FIG. 13.

In some embodiments of the method 1300, identifying the set for each transition includes identifying which of the I and Q components from the previous symbol is relevant for an MSB of an expected symbol of the transition, and identifying which of the I and Q components from the current symbol is relevant for the MSB of the expected symbol of the transition. The I component from the previous symbol may be relevant when it tracks the behavior of the MSB of the expected symbol, the Q component from the previous symbol may be relevant when it tracks the behavior of the MSB of the expected symbol, the I component from the current symbol may be relevant when it tracks the behavior of the MSB of the expected symbol, and the Q component from the current symbol may be relevant when it tracks the behavior of the MSB of the expected symbol. Generating the reliability metric for each transition includes generating a reliability metric for the MSB of the expected symbol of each transition based at least in part on which of the I and Q components from the previous symbol is identified as relevant for the transition and which of the I and Q components from the current symbol is identified as relevant for the transition.

In some embodiments of the method 1300, identifying the set for each transition includes identifying which of the I and Q components from the previous symbol is relevant for an LSB of an expected symbol of the transition, and identifying which of the I and Q components from the current symbol is relevant for the LSB of the expected symbol of the transition. The I component from the previous symbol may be relevant when it tracks the behavior of the LSB of the expected symbol, the Q component from the previous symbol may be relevant when it tracks the behavior of the LSB of the expected symbol, the I component from the current symbol may be relevant when it tracks the behavior of the LSB of the expected symbol, and the Q component from the current symbol may be relevant when it tracks the behavior of the LSB of the expected symbol. Generating the reliability metric for each transition includes generating a reliability metric for the LSB of the expected symbol of each transition based at least in part on which of the I and Q components from the previous symbol is identified as relevant for the transition and which of the I and Q components from the current symbol is identified as relevant for the transition.

In some embodiments of the method 1300, the differentially-encoded input symbols include differentially-encoded QPSK input symbols. In some embodiments, the differentially-encoded input symbols are associated with differentially-encoded 16-QAM input symbols (e.g., FIGS. 10A and 10B).

In some embodiments, a system for soft-decision decoding includes means for determining first reliability information for a subset of the bits corresponding to each symbol transmitted using a differential modulation scheme, where the first reliability information is based on LLR calculations for differentially-encoded data. The means may include, but need not be limited to, a reliability information generator and/or a differential mode generator as illustrated in FIG. 11A and FIG. 11B, for example. The system may also include means for determining second reliability information of a remaining subset of the bits, where the second reliability information is based on LLR calculations for coherently-encoded data. The means may include, but need not be limited to, a reliability information generator and/or a coherent mode generator as illustrated in FIG. 11A and FIG. 11B, for example. The system may further include means for decoding each symbol based on the first reliability information and the second reliability information. The means may include, but need not be limited to, an FEC decoder and/or a symbol decoder as illustrated in FIG. 11A and FIG. 11B, for example. In some embodiments, the differential modulation scheme is a differentially-encoded 16-QAM scheme, the subset of the bits comprises the two highest order bits corresponding to one symbol, and the remaining subset of the bits comprises the two lowest order bits corresponding to that same symbol.

In some embodiments, the system includes means for combining the first reliability information and the second reliability information, and means for decoding each symbol based on the combined reliability information. The means may include, but need not be limited to, a reliability information generator and/or a symbol decoder as illustrated in FIG. 11A and FIG. 11B, for example. The system may further include means for applying weighting factors to one or both of the first reliability information and the second reliability information, means for combining the first reliability information and the second reliability information, and means for decoding each symbol based on the combined reliability information. The means may include, but need not be limited to, a reliability information generator and/or a symbol decoder as illustrated in FIG. 11A and FIG. 11B, for example.

In some embodiments, the system includes means for locating each symbol in a complex plane, and means for determining, based on the location of the symbol, the second reliability information from data stored in a lookup table. The means may include, but need not be limited to, a coherent mode generator and/or an LUT as illustrated in FIG. 11B, for example.

In some embodiments, the system includes means for de-interleaving data corresponding to more than one symbol, and means for decoding the de-interleaved data based on the first reliability information and the second reliability information. The means may include, but need not be limited to, a symbol decoder as illustrated in FIG. 11A and FIG. 11B, for example.

In some embodiments, the differential modulation scheme is a differentially-encoded 16-QAM scheme, and the LLR calculations for the differentially-encoded data are based on LLR calculations for a differentially-encoded QPSK scheme. The LLR calculations for the differentially-encoded QPSK scheme include identifying one or more dominating probability terms, and making the LLR calculations for the differentially-encoded QPSK scheme based on the one or more dominating probability terms.

In some embodiments, the differential modulation scheme is a differentially-encoded 16-QAM scheme, and the LLR calculations for the coherently-encoded data are based on LLR calculations for a coherently-encoded 16-QAM scheme. The system may include means for locating each symbol in a complex plane, and means for determining, based on the location of the symbol, the LLR calculations for the coherently-encoded 16-QAM scheme from data stored in a lookup table. The means may include, but need not be limited to, a coherent mode generator and/or an LUT as illustrated in FIG. 11B, for example.

In some embodiments, the system includes means for scaling values associated with the first reliability information and the second reliability information based on $E_S/N_0$ measurements. The means may include, but need not be limited to, a reliability information generator as illustrated in FIG. 11A and FIG. 11B, for example. The system may include means for determining that the differential modulation scheme is a differentially-encoded QPSK scheme, means for determining first reliability information for the bits corresponding to each symbol based on LLR calculations for the differentially-encoded QPSK scheme, and means for decoding each symbol based on the first reliability information, where the determination of second reliability information is discarded or ignored for the differentially-encoded QPSK scheme. The means may include, but need not be limited to, an FEC decoder, a reliability information generator, and/or a symbol decoder as illustrated in FIG. 11A and FIG. 11B, for example.

In some embodiments, a system for soft decision differential encoding includes means for receiving multiple differentially-encoded input symbols each having I and Q components. The means may include, but need not be limited to, a receiver as illustrated in FIG. 11A and FIG. 11B, for example. The system also includes means for identifying a set of terms for each transition between the differentially-encoded input symbols to calculate reliability of the respective transition, where the set for each transition is identified based at least in part on which of the I and Q components from a previous symbol is relevant for the transition and which of the I and Q components of a current symbol is relevant for the transition. The means may include, but need not be limited to, a reliability information generator and/or a differential mode generator as illustrated in FIG. 11A and FIG. 11B, for example. The system also includes means for generating a reliability metric for each transition using the respective set. The means may include, but need not be limited to, a reliability information generator and/or a differential mode generator as illustrated in FIG. 11A and FIG. 11B, for example.

In some embodiments of the system, the means for identifying the set for each transition include means for identifying which of the I and Q components from the previous symbol is relevant for an MSB of an expected symbol of the transition, and means for identifying which of the I and Q components from the current symbol is relevant for the MSB of the expected symbol of the transition. The I component from the previous symbol may be relevant when it tracks the behavior of the MSB of the expected symbol, the Q component from the previous symbol may be relevant when it tracks the behavior of the MSB of the expected symbol, the I component from the current symbol may be relevant when it tracks the behavior of the MSB of the expected symbol, and the Q component from the current symbol may be relevant when it tracks the behavior of the MSB of the expected symbol. In some embodiments, the means for generating the reliability metric for each transition include means for generating a reliability metric for the MSB of the expected symbol of each transition based at least in part on which of the I and Q components from the previous symbol is identified as relevant for the transition and which of the I and Q components from the current symbol is identified as relevant for the transition.

In some embodiments of the system, the means for identifying the set for each transition include means for identifying which of the I and Q components from the previous symbol is relevant for an LSB of an expected symbol of the transition, and means for identifying which of the I and Q components from the current symbol is relevant for the LSB of the expected symbol of the transition. The I component from the previous symbol may be relevant when it tracks the behavior of the LSB of the expected symbol, the Q component from the previous symbol may be relevant when it tracks the behavior of the LSB of the expected symbol, the I component from the current symbol may be relevant when it tracks the behavior of the LSB of the expected symbol, and the Q component from the current symbol may be relevant when it tracks the behavior of the LSB of the expected symbol. In some embodiments, the means for generating the reliability metric for each transition include means for generating a reliability metric for the LSB of the expected symbol of each transition based at least in part on which of the I and Q components from the previous symbol is identified as relevant for the transition and which of the I and Q components from the current symbol is identified as relevant for the transition.

In some embodiments of the system, the differentially-encoded input symbols include differentially-encoded QPSK input symbols. In some embodiments, the differentially-encoded input symbols are associated with differentially-encoded 16-QAM input symbols (e.g., FIGS. 10A and 10B).

While the various embodiments and examples described above have been illustrated with reference to optical communication systems that use fiber optic cables as a data transmission medium or path, those embodiments and examples may also be applicable to systems in which communications occur through other types of transmission media or paths. For example, some or all of the embodiments and examples describe above may be applicable to communications through free space or similar media in which electromagnetic signals are radiated, such as cellular communications, point-to-point communications, and satellite communications, to name a few.

As will be readily understood, the components and modules described with reference to various embodiments above may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of embodiments of the principles described herein.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the principles described herein. For example, the above elements may merely be a component of a larger system, wherein other rules may take precedence over or otherwise modify the application of the principles described herein. Also, a number of steps may be undertaken before, during, or after the above elements are considered. Accordingly, the above description should not be taken as limiting the scope of the invention.

What is claimed is:

1. A method for soft-decision decoding, comprising:
receiving a digitized signal comprising a series of symbols transmitted using a differential/coherent modulation scheme, each symbol of the series of symbols corresponding to a set of bits, wherein a first subset of the set of bits is modulated using a differential modulation scheme and a second subset of the set of bits is modulated using a coherent modulation scheme;
determining first reliability information for the series of symbols based on log likelihood ratio (LLR) calculations for differentially-encoded data for the first subset of the set of bits for the each symbol of the series of symbols;
determining second reliability information for the series of symbols based on LLR calculations for coherently-encoded data for the second subset of the set of bits for the each symbol of the series of symbols; and
decoding the series of symbols based on the first reliability information and the second reliability information.

2. The method of claim 1, further comprising:
combining the first reliability information and the second reliability information; and
decoding the series of symbols based on the combined reliability information.

3. The method of claim 1, further comprising:
applying weighting factors to one or both of the first reliability information and the second reliability information;
combining the first reliability information and the second reliability information; and
decoding each symbol based on the combined reliability information.

4. The method of claim 1, further comprising:
locating each symbol in a complex plane; and
determining, based on the location of the symbol, the second reliability information from data stored in a lookup table.

5. The method of claim 1, wherein:
the differential/coherent modulation scheme is a differentially/coherently-encoded 16 Quadrature Amplitude Modulation (16-QAM) scheme,
the first subset of the bits comprises the two highest order bits corresponding to one symbol, and
the second subset of the bits comprises the two lowest order bits corresponding to the one symbol.

6. The method of claim 1, further comprising:
de-interleaving data corresponding to more than one symbol; and
decoding the de-interleaved data based on the first reliability information and the second reliability information.

7. The method of claim 1, wherein:
the differential/coherent modulation scheme is a differentially/coherently-encoded 16-QAM scheme, and
the LLR calculations for the differentially-encoded data are based on LLR calculations for a differentially-encoded Quadrature Phase-Shift Keying (QPSK) scheme.

8. The method of claim 7, wherein the LLR calculations for the differentially-encoded QPSK scheme include:
identifying one or more dominating probability terms; and
making the LLR calculations for the differentially-encoded QPSK scheme based on the one or more dominating probability terms.

9. The method of claim 1, wherein:
the differential/coherent modulation scheme is a differentially/coherently-encoded 16-QAM scheme, and
the LLR calculations for the coherently-encoded data are based on LLR calculations for a coherently-encoded 16-QAM scheme.

10. The method of claim 9, further comprising:
locating each symbol in a complex plane; and
determining, based on the location of the symbol, the LLR calculations for the coherently-encoded 16-QAM scheme from data stored in a lookup table.

11. The method of claim 1, further comprising:
scaling values associated with the first reliability information and the second reliability information based on energy-per-symbol to noise power spectral density ratio (ES/N0) measurements.

12. The method of claim 1, further comprising:
determining the first reliability information for the bits corresponding to each symbol based on LLR calculations for a differentially-encoded QPSK scheme; and
decoding each symbol based on the first reliability information, the determination of second reliability information being discarded or ignored for the differentially-encoded QPSK scheme.

13. A system for soft-decision decoding, comprising:
means for receiving a digitized signal comprising a series of symbols transmitted using a differential/coherent modulation scheme, each symbol of the series of symbols corresponding to a set of bits, wherein a first subset of the set of bits is modulated using a differential modulation scheme and a second subset of the set of bits is modulated using a coherent modulation scheme;
means for determining first reliability information for the series of symbols based on log likelihood ratio (LLR) calculations for differentially-encoded data for the first subset of the set of bits for the each symbol of the series of symbols;
means for determining second reliability information for the series of symbols based on LLR calculations for coherently-encoded data for the second subset of the set of bits for the each symbol of the series of symbols; and
means for decoding the series of symbols based on the first reliability information and the second reliability information.

14. The system of claim 13, further comprising:
means for combining the first reliability information and the second reliability information; and
means for decoding the series of symbols based on the combined reliability information.

15. The system of claim 13, further comprising:
means for applying weighting factors to one or both of the first reliability information and the second reliability information;
means for combining the first reliability information and the second reliability information; and
means for decoding each symbol based on the combined reliability information.

16. The system of claim 13, further comprising:
means for locating each symbol in a complex plane; and
means for determining, based on the location of the symbol, the second reliability information from data stored in a lookup table.

17. The system of claim 13, wherein:
the differential/coherent modulation scheme is a differentially/coherently-encoded 16 Quadrature Amplitude Modulation (16-QAM) scheme, and
the LLR calculations for the differentially-encoded data are based on LLR calculations for a differentially-encoded Quadrature Phase-Shift Keying (QPSK) scheme.

18. The system of claim 17, further comprising:
means for identifying one or more dominating probability terms; and
means for making the LLR calculations for the differentially-encoded QPSK scheme based on the one or more dominating probability terms.

19. The system of claim 13, wherein:
the differential/coherent modulation scheme is a differentially/coherently-encoded 16 Quadrature Amplitude Modulation (16-QAM) scheme, and
the LLR calculations for the coherently-encoded data are based on LLR calculations for a coherently-encoded 16-QAM scheme.

20. The system of claim 19, further comprising:
means for locating each symbol in a complex plane; and
means for determining, based on the location of the symbol, the LLR calculations for the coherently-encoded 16-QAM scheme from data stored in a lookup table.

21. A receiver device, comprising:
a receiver configured to receive a digitized signal comprising a series of symbols transmitted using a differential/coherent modulation scheme, each symbol of the series of symbols corresponding to a set of bits, wherein a first subset of the set of bits is modulated using a differential modulation scheme and a second subset of the set of bits is modulated using a coherent modulation scheme;
a reliability information generator configured to:
  determine first reliability information for the series of symbols based on log likelihood ratio (LLR) calculations for differentially-encoded data for the first subset of the set of bits for the each symbol of the series of symbols, and
  determine second reliability information for the series of symbols based on LLR calculations for coherently-encoded data for the second subset of the set of bits for the each symbol of the series of symbols; and
a decoder configured to decode the series of symbols based on the first reliability information and the second reliability information.

22. The receiver device of claim 21, wherein:
the reliability information generator is configured to combine the first reliability information and the second reliability information, and
the decoder is configured to decode the series of symbols based on the combined reliability information.

23. The receiver device of claim 21, wherein:
the reliability information generator is configured to apply weighting factors to one or both of the first reliability information and the second reliability information, and to combine the first reliability information and the second reliability information, and
the decoder is configured to decode the series of symbols based on the combined reliability information.

24. The receiver device of claim 21, wherein the reliability information generator is configured to locate each symbol in a complex plane, and to determine, based on the location of the symbol, the second reliability information from data stored in a lookup table.

25. The receiver device of claim 21, wherein:
the differential/coherent modulation scheme is a differentially/coherently-encoded 16 Quadrature Amplitude Modulation (16-QAM) scheme, and
the LLR calculations for the differentially-encoded data are based on LLR calculations for a differentially-encoded Quadrature Phase-Shift Keying (QPSK) scheme.

26. The receiver device of claim 25, wherein the reliability information generator is configured to:
identify one or more dominating probability terms; and
make the LLR calculations for the differentially-encoded QPSK scheme based on the one or more dominating probability terms.

27. The receiver device of claim 21, wherein:
the differential/coherent modulation scheme is a differentially/coherently-encoded 16 Quadrature Amplitude Modulation (16-QAM) scheme, and
the LLR calculations for the coherently-encoded data are based on LLR calculations for a coherently-encoded 16-QAM scheme.

28. The receiver device of claim 27, wherein the reliability information generator is configured to locate each symbol in a complex plane, and to determine, based on the location of the symbol, the LLR calculations for the coherently-encoded 16-QAM scheme from data stored in a lookup table.

* * * * *